US008419550B2

(12) United States Patent
Anthony et al.

(10) Patent No.: US 8,419,550 B2
(45) Date of Patent: Apr. 16, 2013

(54) CASHBOX SECURITY MECHANISM AND GAMING MACHINES WITH A CASHBOX SECURITY MECHANISM

(75) Inventors: Philip Anthony, Chicago, IL (US); Jacob Greenberg, Elgin, IL (US); James Lipsey, Oak Park, IL (US); Daniel Somen, Chicago, IL (US); William Venth, Chicago, IL (US); Scott Zeeb, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 790 days.

(21) Appl. No.: 12/615,124

(22) Filed: Nov. 9, 2009

(65) Prior Publication Data

US 2011/0111866 A1 May 12, 2011

(51) Int. Cl.
*A63F 13/00* (2006.01)

(52) U.S. Cl.
USPC ......... 463/47; 463/46; 273/138.1; 273/148 R; 273/309

(58) Field of Classification Search .................... 463/47, 463/16, 46; 273/138.1, 148 R, 309
See application file for complete search history.

(56) References Cited

U.S. PATENT DOCUMENTS

| | | | | |
|---|---|---|---|---|
| 3,966,116 | A | 6/1976 | Dominick et al. | |
| 5,533,605 | A | 7/1996 | Mays et al. | |
| 5,876,285 | A | 3/1999 | Salour et al. | |
| 5,944,163 | A | 8/1999 | Keith, III et al. | |
| 6,138,814 | A | 10/2000 | Miller et al. | |
| 6,352,175 | B2 | 3/2002 | Izawa et al. | |
| 6,712,352 | B2 | 3/2004 | Bergeron et al. | |
| 7,335,903 | B1 | 2/2008 | Yang et al. | |
| 2003/0064791 | A1 * | 4/2003 | Hedrick et al. | 463/25 |
| 2004/0087374 | A1 | 5/2004 | Cole | |
| 2004/0132528 | A1 | 7/2004 | Gauselmann | |
| 2004/0214645 | A1 | 10/2004 | Hedrick et al. | |
| 2006/0081441 | A1 | 4/2006 | Vysma et al. | |
| 2008/0017473 | A1 | 1/2008 | Nunn et al. | |
| 2009/0272621 | A1 | 11/2009 | Braukmann et al. | |

FOREIGN PATENT DOCUMENTS

| | | |
|---|---|---|
| JP | 7217282 | 8/1995 |
| JP | 2009048664 | 3/2009 |
| WO | WO 0201514 | 1/2002 |
| WO | WO 2004081739 | 9/2004 |

* cited by examiner

*Primary Examiner* — Ronald Laneau
*Assistant Examiner* — Ross Williams
(74) *Attorney, Agent, or Firm* — Nixon Peabody LLP

(57) ABSTRACT

Cashbox security mechanisms, gaming machines with a cashbox security mechanism, and methods for securing and removing a portable cashbox from a gaming machine are presented herein. The cashbox security mechanism stores and secures a cashbox, which stows currency received, for example, from a currency processing device. The cashbox security mechanism includes an outer housing, such as a gaming machine cabinet or a substructure mounted inside a cabinet. An inner chassis mates with and retains the cashbox. The inner chassis and a security door are pivotably mounted with respect to the outer housing. The security door and inner chassis are positionable to cooperatively secure the cashbox within the cashbox security mechanism. Likewise, the security door and inner chassis are respositionable to cooperatively define an access chute through which the cashbox is removable from the cashbox security mechanism.

26 Claims, 13 Drawing Sheets

CASHBOX SECURITY MECHANISM AND GAMING MACHINES WITH A CASHBOX SECURITY MECHANISM

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to hoppers, cashboxes, and similar structures for receiving, storing, and/or transporting coins and currency documents. More particularly, the present invention relates to cashbox security mechanisms and gaming machines using the same.

BACKGROUND OF THE INVENTION

Gaming terminals, such as slot machines, video poker machines, and the like, have been a cornerstone of the gaming industry for several years. There are a variety of coin-operated and currency bill-operated gaming machines in widespread use. Historically, basic mechanical slot machines required players to insert coins or tokens to initiate the wagering game. The coins/tokens deposited by each player were traditionally stored in a coin hopper contained in the machine. Until recently, gaming machines paid out all winnings in coins.

In modern practice, most gaming machines are equipped to accept paper currency, such as cash notes (e.g. a United States $1, $5, $10, $20, $50 or $100 bills), and substitute currency media, such as casino script and cashout vouchers, collectively referred to herein as "currency documents". As such, it has become increasingly common for manufacturers of gaming systems and devices to incorporate a currency processing mechanism into the gaming machine. The currency processing mechanism is often housed inside of the gaming machine, but may also be located externally in close proximity to the machine.

The currency processing mechanism allows a player to insert currency documents and substitute currency media directly into the gaming machine. Currency processing mechanisms receive currency, typically one sheet at a time, through an input slot. A transport mechanism transports the currency past one or more sensors which are employed, for example, to count, denominate, and/or authenticate the currency. Upon receipt of the currency and verification by the processing mechanism, the controller of the gaming machine issues credits based on the value of the deposited currency. If the scanned currency is determined to be authentic, it is transported to a bill hopper or cashbox for storage.

Some currency processing mechanisms are designed to store paper currency and function as a "payout device", both accepting currency from a customer and returning currency to the customer for payouts. Alternatively, many gaming establishments have introduced "cashout" tickets or coupons, which substitute as cash. When a player wins a large sum of money, rather than paying out the entire winnings in cash, the machine will dispense a ticket or voucher, supplemented by coins. The ticket may be exchanged for money at a cash-vending kiosk or cashier's window, or used at other gaming machines in the establishment. In the latter instance, the deposited ticket is stored in the gaming machine, either in a dedicated hopper or along with validated paper currency in a single hopper or cashbox.

In many configurations, the currency receptacle is permanently attached to the gaming device; once accessed, the currency documents are simply removed from the machine. In other configurations, the currency receptacle is in the form of a removable and transportable cashbox or cassette. Conventionally, as the individual cashboxes reach a predetermined limit, casino staff are required to remove the filled cashbox, and replace it with an empty cashbox. The filled cashbox is taken to an accounting room where the box contents are counted, sorted, and stored. Typical prior art cashboxes are generally not designed for the most efficient storage, removal, and handling of collected currency.

State regulatory agencies, such as the Nevada Gaming Control Board, have placed stringent requirements on gaming establishments regarding the handling, counting, and distribution of money and coins. In addition, security is a major issue in the gaming industry, including the prevention of theft by visitors and employees of the establishment. Still further, money input to and extracted from each gaming machine must be tracked on a machine-by-machine basis to ensure proper operation of each gaming machine. Consequently, proper security mechanisms are necessary to comply with state regulations, to accommodate accounting measures, and to prevent illicit removal of the cashbox and the contents thereof.

SUMMARY OF THE INVENTION

According to one embodiment of the present invention, a gaming machine for playing a wagering game is presented. The gaming machine is configured to receive a portable cashbox configured to accept and retain currency deposited into the gaming machine. The present embodiment includes a cabinet having at least one input configured to receive currency from a player. A display is positioned relative to the cabinet, and configured to display an outcome of the wagering game. A currency processing device is positioned relative to the cabinet. The currency processing device is configured to process currency received via the at least one input. The gaming machine of this embodiment also includes an inner chassis configured to hold the cashbox. The inner chassis is movably mounted inside the cabinet to selectively transition between first and second positions. A security door is also movably mounted inside the cabinet, selectively transitioning between respective first and second positions. The security door, when in the first security door position, cooperates with the inner chassis, when in the first chassis position, to secure the cashbox within the inner chassis.

According to one aspect of the present concepts, the security door, when in the second security door position, cooperates with the inner chassis, when in the second chassis position, to define an access chute through which the cashbox is accessible and removable from the inner chassis.

In other aspects of the present concepts, the gaming machine further comprises an outer housing that is disposed inside the cabinet. In this instance, the inner chassis and security door are movably mounted to the outer housing. The outer housing may include a base, a top, and a plurality of sidewalls that are interconnected to collectively define a cavity with an opening. The inner chassis may be located at least partially inside of the cavity. In addition, or as an alternative feature, the security door at least partially obstructs the cavity opening when in the first security door position.

In other aspects of the present concepts, the inner chassis includes a base attached to a plurality of sidewalls to collectively define a pocket. The inner chassis pocket may be shaped and sized such that the cashbox nests inside the pocket generally coterminous therewith.

According to other aspects of the present concepts, the cashbox security mechanism may include a biasing member operatively engaged with the inner chassis to bias the same toward the first position. Additionally, or as an alternative thereto, a motion damper may be operatively engaged with the inner chassis to dampen movement of the same when moving from the first position to the second position. In yet another addition or alternative, the security door may be mechanically coupled to the inner chassis such that the biasing member biases the security door toward the first security door position by biasing the inner chassis toward the first chassis position. Moreover, the motion damper operates to dampen movement of the security door when moving from the first position to the second position by damping movement of the inner chassis through the mechanical coupling between the security door and inner chassis.

In accordance with other aspects of the present concepts, the security door may be mechanically coupled to the inner chassis to thereby synchronize movement of the security door and the inner chassis between respective first and second positions. In addition, or as an alternative thereto, transitioning the inner chassis from the first chassis position to the second chassis position may urge the security door from the first security door position to the second security door position through the mechanical coupling. In one exemplary configuration, the mechanical coupling may comprise a pin and slot arrangement. For instance, a guide pin, protruding from the inner chassis or security door, is slidably received in a guide channel, which is defined by the other of the inner chassis and security door. In this example, the guide pin slides between first and second longitudinal ends of the guide channel coincident with the inner chassis transitioning from the first position to the second position, concomitantly pressing against lateral walls of the guide channel thereby repositioning the security door.

According to yet other aspects of the present concepts, the cashbox security mechanism includes a chassis latch that selectively couples with the inner chassis, thereby selectively retaining the inner chassis in the first position. This optional arrangement also includes a lock box that is in operative communication with the chassis latch. The lock box controls the selective coupling/decoupling of the chassis latch with the inner chassis, and thus the selective retention of the inner chassis in the first position. In an exemplary configuration, the chassis latch may include a latch control plate that is movably mounted with respect to the outer housing. The latch control plate is configured to selectively engage a lock pin that protrudes from the inner chassis, thereby selectively retaining the inner chassis in the first position. In this instance, activating the lock box may disengage the chassis latch control plate from the lock pin, allowing the inner chassis to transition to the second position.

In one representative design, the lock box may include a primary lock mechanism and a secondary lock mechanism. The primary lock mechanism may be coupled to the chassis latch (e.g., via a cable), whereby activating the primary lock mechanism operates to disengage the chassis latch from the inner chassis. In contrast, the secondary lock mechanism operates to disable the primary lock mechanism and prevent tampering with the primary lock mechanism. The secondary lock mechanism, when in a deactivated state, selectively engages and thereby retains the primary lock mechanism in a deactivated state. Activating the secondary lock mechanism disengages the secondary lock mechanism from the primary lock mechanism, thus allowing for activation of the primary lock mechanism.

As part of yet other aspects of the present concepts, the primary lock mechanism may comprise a fork that is coupled at one end to a primary key lock and at another, opposing end to a chassis latch cable for concurrent rotation therewith. In this exemplary configuration, the fork is rotatably mounted inside of a lock box housing. For example, the fork may include a primary shaft protruding from a first side thereof and received in a complimentary shaft slot defined by the lock box housing. Moreover, the fork may further include first and second fork pins protruding from a second side thereof. Each of the fork pins is received in a respective complimentary hole in a cam plate that is attached to the primary key lock for concurrent rotation therewith. In addition, or as an alternative thereto, the secondary lock mechanism may comprise a jam plate coupled to a secondary key lock for concurrent rotation therewith. The jam plate of this arrangement selectively engages the fork, thereby preventing rotation of the same.

In accordance with other aspects of the present concepts, the cashbox security mechanism includes an access door pivotably mounted to the cabinet to selectively transition between first and second access door positions. The access door of this exemplary arrangement obstructs access to the inner chassis and security door when in the first position, but provides access to the inner chassis and security door when in the second position. An access door latch may be provided that is configured to couple with and selectively retain the access door in the first position. In one option facet of this exemplary configuration, the access door latch is mechanically coupled to the inner chassis. The inner chassis operates to trigger the access door latch mechanism, releasing the access door, by passing a predetermined intermediate position when transitioning from the first position toward the second position. A biasing member may be provided to operatively engage with the access door and bias the same toward the second access door position.

According to another embodiment of the present invention, a cashbox security mechanism is provided for securing a cashbox. The cashbox is configured to stow currency received from a currency processing device. In this embodiment, the security mechanism includes an outer housing in operative communication with the currency processing device to receive currency therefrom. An inner chassis configured to retain the cashbox is mounted to the outer housing to selectively transition between first and second positions. A security door is also mounted to the outer housing, selectively transitioning between respective first and second positions. The security door cooperates with the inner chassis when both are in their respective first positions to secure the cashbox within the outer housing. Contrastingly, the security door cooperates with the inner chassis when both are in their respective second positions to define an access chute through which the cashbox is accessible and removable from the cashbox security mechanism According to yet another embodiment of the invention, a wagering game machine for playing a wagering game is presented. The wagering game machine includes a cabinet with at least one display operable to display a randomly selected outcome of the wagering game. A currency processing device is housed within the cabinet. The currency processing device is operable to receive currency from the player for playing the wagering game. A removable cashbox is also located inside the cabinet. The cashbox stows the currency received by the currency processing device. The wagering game machine further comprises a moveable chassis that holds the portable cashbox. The chassis is moveable between first and second chassis positions. The portable cashbox is secured within the cabinet when the moveable chassis is in the first chassis position, and removable from the cabinet when the moveable chassis is in the second chassis position. An access door is fixed to the cabinet. When opened, the access door permits removal of the portable cashbox; when the moveable chassis is in the second chassis position. A lock assembly that, when actuated, automatically causes the moveable chassis to transition from the first chassis position to the second chassis position.

According to some aspects of the present concepts, the lock assembly, when actuated, automatically causes the moveable chassis to transition from the first chassis position to the second chassis position due to the force of gravity on the moveable chassis. Moreover, the lock assembly, when actuated, may automatically cause the access door to move to an open position to permit removal of the portable cashbox. In addition, or as an alternative thereto, a moveable security door may coupled to the chassis through a mechanical coupling. In this instance, the security door is automatically moved between first and second security door positions due to the force of gravity on the moveable chassis. The chassis, security door, and access door may be moveable between respective positions through rotational, rectilinear, or other movement.

In accordance with yet another embodiment of the present invention, a method for securing a cashbox inside a wagering game machine is presented. The method includes: passing the cashbox through an access opening in the wagering game machine cabinet; placing the cashbox inside a chassis that is movably mounted inside the cabinet of the wagering game machine, the chassis having an opening through which the cashbox is received; and moving the chassis from an unsecured orientation, at which the chassis opening is aligned with the cabinet access opening such that the cashbox is receivable by the chassis, to a securing orientation, at which the chassis opening is misaligned with the cabinet access opening such that the cashbox is not removable from the cabinet. The method may also comprise moving a security door from an unblocking orientation, at which the security door and chassis collectively define an access chute through which the cashbox is removable from the cabinet, to a blocking orientation, at which the security door obstructs the chassis opening thereby at least partially concealing the cashbox inside the chassis.

In accordance with even yet another embodiment of the present invention, a method for removing a portable cashbox from a cabinet of a wagering game machine is disclosed. The method comprises: activating a lock mechanism to thereby unlatch a movable chassis, the cashbox being stowed inside the movable chassis. Activating the lock mechanism automatically: pivots the movable chassis, under the force of gravity, from a secured orientation, at which the cashbox is locked inside the cabinet, to an unsecured orientation, at which the cashbox is removable from the cabinet; triggers an access door latch mechanism to thereby unlatch an access door movably mounted to cabinet; and pivots the access door, under the force of a biasing member, from a closed orientation, at which the access door obstructs an access opening in the cabinet through which the cash box is removable, to an open orientation, at which the access door exposes the access opening. The method then includes removing the portable cashbox from the movable chassis and wagering game machine cabinet.

The above summary of the invention is not intended to represent each embodiment, or every aspect, of the present invention. The above features and advantages, and other features and advantages of the present invention, will be readily apparent from the following detailed description of the preferred embodiments and best modes for carrying out the present invention when taken in connection with the accompanying drawings and appended claims.

Figure 1:
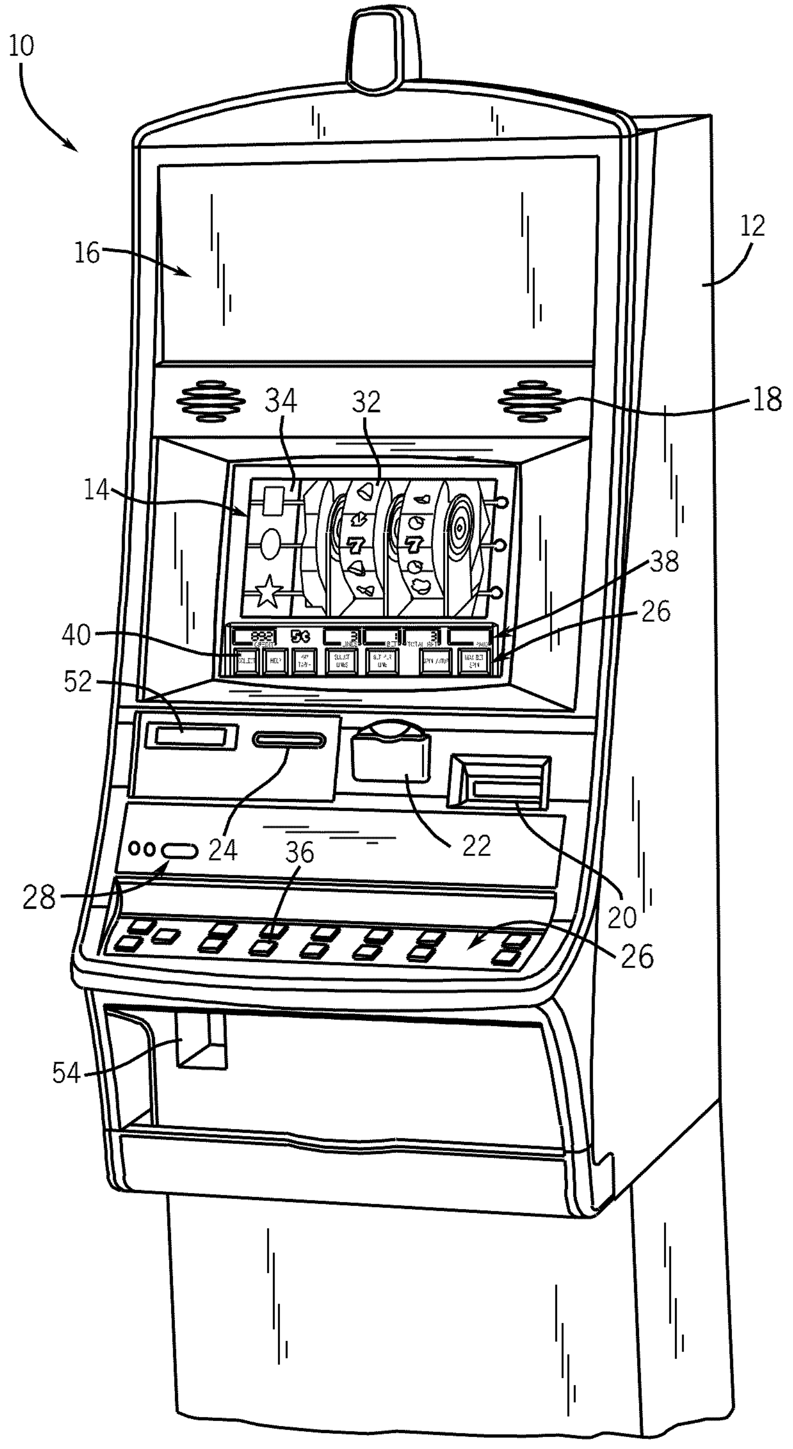
FIG. 1 is a perspective-view illustration of an exemplary free-standing gaming machine in accordance with embodiments of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE EMBODIMENTS

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. To that extent, elements and limitations that are disclosed herein, for example, in the Summary of the Invention and Detailed Description of the Embodiments sections, but not explicitly set forth in the claims, should not be incorporated into the claims, singly or collectively, by implication, inference or otherwise.

Referring to FIG. 1, there is shown an exemplary gaming terminal 10 (also referred to herein as "wagering game machine" or "gaming machine") similar to those used in traditional gaming establishments, such as casinos, and non-traditional gaming establishments, such as pools, hotels, restaurants, and airports. With regard to the present invention, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing gaming terminal of the upright type, the "machines" of the present invention may take on a wide variety of other forms, such as free-standing gaming terminals of the slant-top type, or non-gaming terminals, such as cash-processing machines or casino player-card kiosks.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20 (also referred to herein as "currency processing device"), a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in commonly owned U.S. Pat. No. 6,517,433, to Loose et al., entitled "Reel Spinning Slot Machine With Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10.

The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Similarly, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328, to Holch et al., entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

Figure 2:
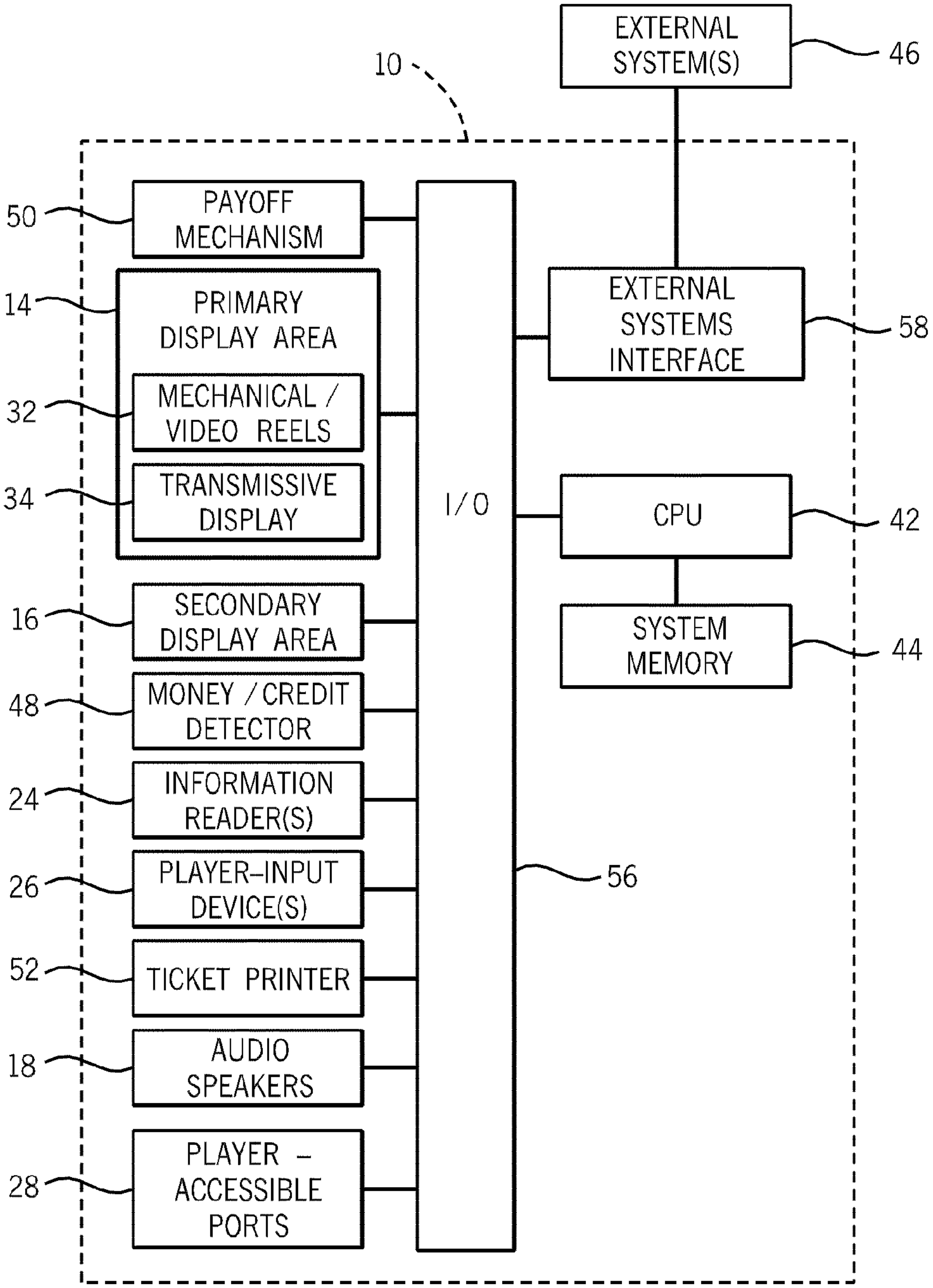
FIG. 2 is a schematic diagram of an exemplary gaming system in accordance with embodiments of the present invention.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device(s). The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and/or multiple program memories. The money/credit detector 48 signals the processor 42 that money and/or credits have been input via a value-input device, such as the bill validator 20 or coin acceptor 22 of FIG. 1, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game (s), or via an external game or event. The payoff may be provided in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 may be connected to an external system interface 58, which is connected to the external system 46. In this exemplary configuration, the controller 42 communicates with the external system 46 via the external system interface 58 and a communication path (e.g., serial, parallel, IR, RC, 10 bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
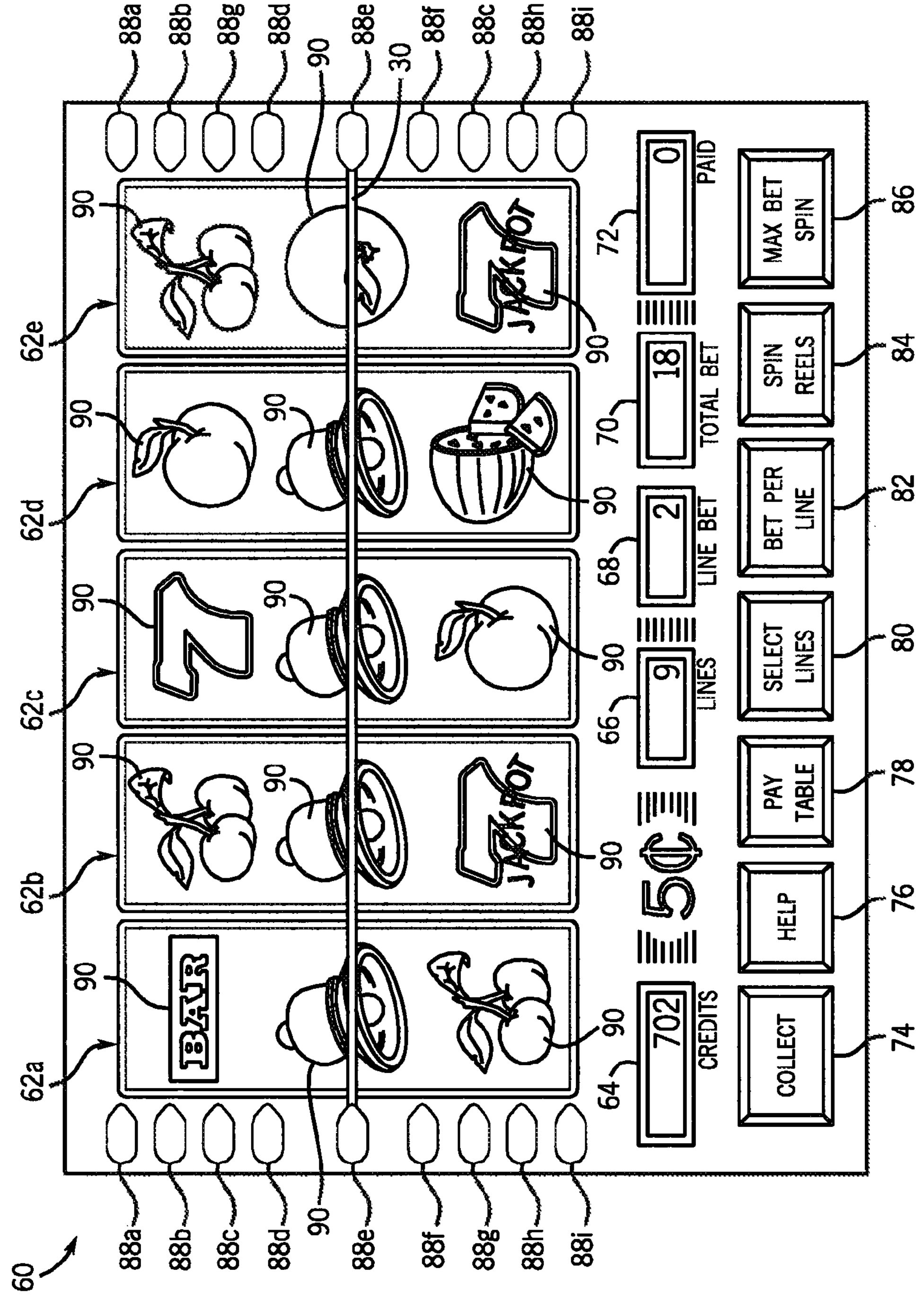
FIG. 3 is a screen shot of a basic-game screen of an exemplary wagering game that may be played on the gaming machine of FIG. 1 and/or gaming system of FIG. 2.

Referring now to FIG. 3, an image of a basic-game screen 60 adapted to be displayed on the primary display area 14 of FIG. 1 is illustrated, according to one embodiment of the present invention. A player begins play of a basic wagering game by providing a wager (e.g., inserting a cash note or substitute currency media into the validator 20, and/or inserting a player-card into information reader 24). A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation, animation, or other indicia, and may further include a "blank" symbol.

Symbol combinations may be evaluated as line pays or "scatter pays". Line pays may be evaluated left to right, right to left, top to bottom, bottom to top, or any combination thereof by evaluating the number, type, or order of symbols 90 appearing along an activated payline 30. Scatter pays, on the other hand, are evaluated without regard to position or paylines, and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown, a gaming terminal with any plurality of reels may also be used in accordance with the present invention.

Figure 4:
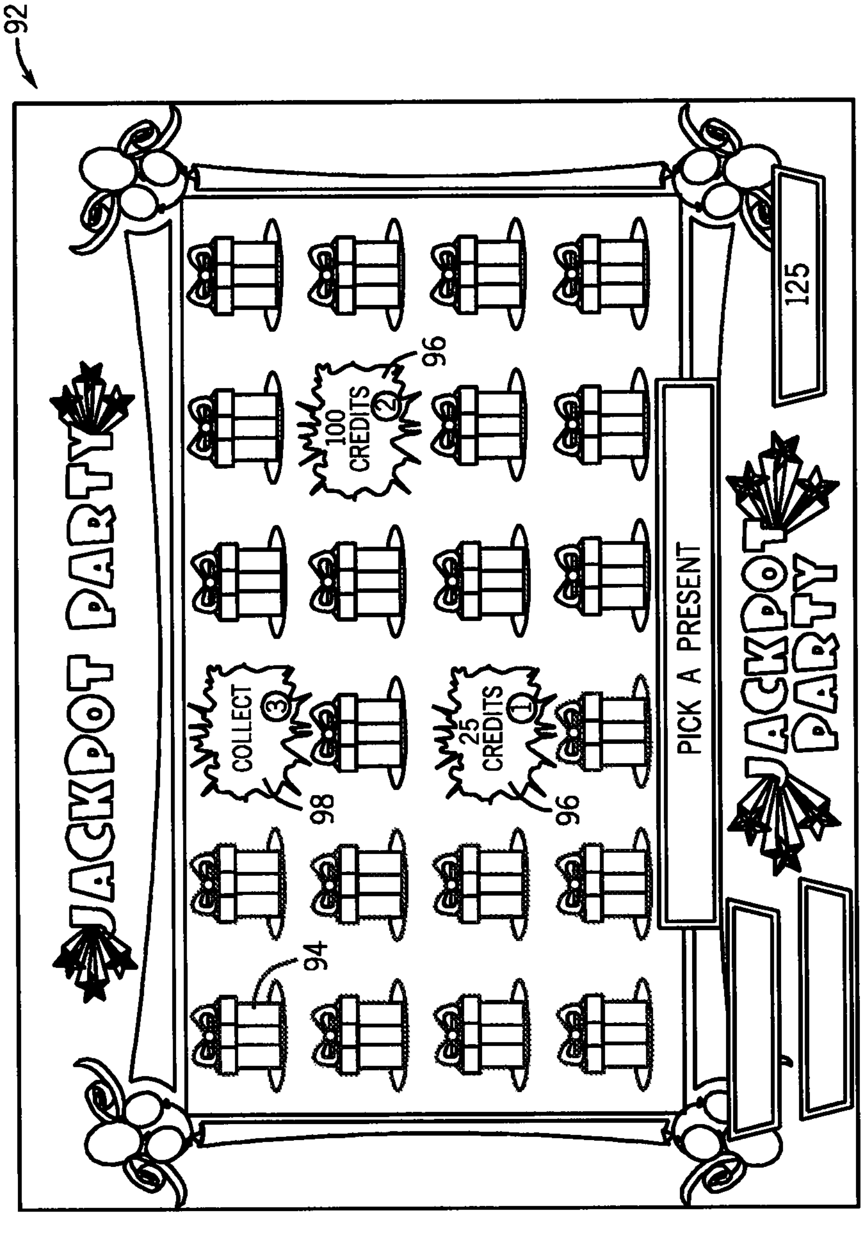
FIG. 4 is a screen shot of a bonus-game screen of an exemplary wagering game that may be played on the gaming machine of FIG. 1 and/or gaming system of FIG. 2.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a standalone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Referring now to FIGS. 5A-5D, a side-view illustration of a gaming machine, designated generally as 110 (also referred to herein as "wagering game machine" or "gaming terminal"), containing a cashbox security mechanism, designated generally as 160, is presented in accordance with embodiments of the present invention. The gaming machine 110 may be any type of gaming terminal, such as an electromechanical or electronic gaming terminal, and may have varying structures and methods of operation. While shaped a bit differently, the gaming machine 110 may comprise the same or similar constituent parts (referenced with 100-series reference numerals) as the gaming terminal 10 discussed above with respect to FIG. 1 and, thus, function in a manner similar to the gaming terminal 10 of FIG. 1. For example, the gaming machine 110 of FIGS. 5A-5D comprises a cabinet or housing 112. The gaming machine 110 also includes a primary display area 114, an optional secondary display area 116, and one or more audio speakers (not visible in the views provided) as output devices. Similar to the embodiments described above with respect to FIG. 1, the primary display area 114 and/or secondary display area 116 of FIGS. 5A-5D may display information associated with wagering games, non-wagering games, community games, progressives, advertisements, services, premium entertainment, text messaging, emails, alerts or announcements, broadcast information, subscription information, etc. The gaming machine 110 also includes similar input devices, such as a bill validator 120 and money/credit detector 148 (which may be referred to collectively as "currency processing device"), as well as a coin acceptor, information reader(s), player-input device(s), and player-accessible port(s) (none of which are visible in the views provided).

Continuing with the above example, the various components of the gaming machine 110 may be controlled by a central processing unit (CPU), such as CPU 42 described hereinabove with respect to FIG. 2, which may use a random number generator (RNG) or pooling scheme to randomly generate wagering game outcomes. Also similar to the embodiment of FIG. 2, the CPU of FIGS. 5A-5D may be coupled to a system memory and a money/credit detector. The money/credit detector signals the CPU that money and/or credits have been input via a value-input device or other sources. The CPU of FIGS. 5A-5D, similar to the controller 42 seen in FIG. 2, may also be connected to, and operable to control, the display areas 114, 116, the various player-input devices, and a payoff mechanism. Communication between the CPU and both the peripheral components of the gaming machine 110 and the external system (e.g., 46 of FIG. 2) may occur, for example, through an input/output (I/O) circuit, such as I/O circuit 56 of FIG. 2, or other suitable interconnection architecture. The I/O circuit may be connected to an external system interface (e.g., 58 of FIG. 2), which is connected to the external system.

Figure 5A:
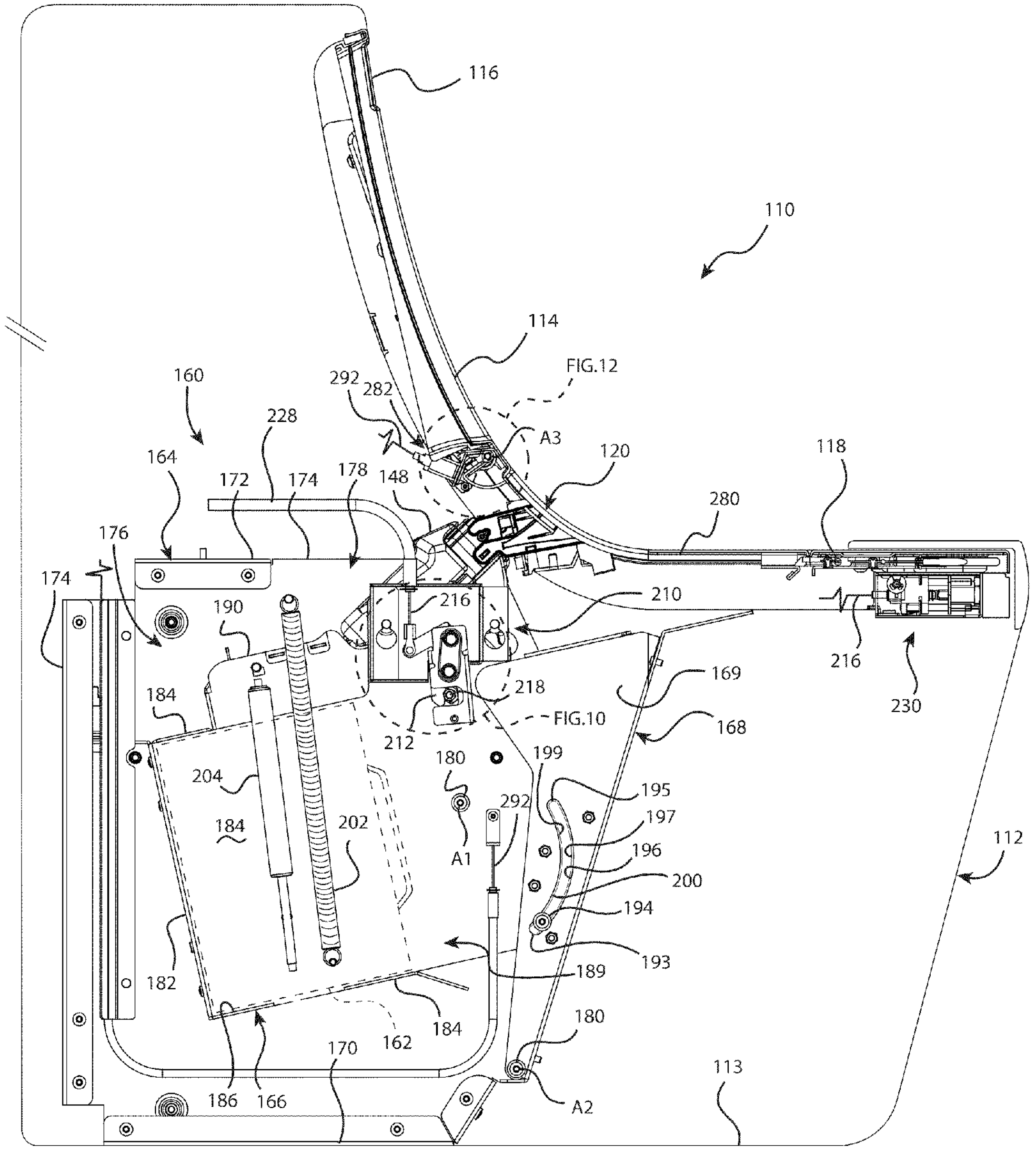
FIG. 5A is a side-view illustration of a gaming machine and a cashbox security mechanism in accordance with embodiments of the present invention, with a portion of the security mechanism outer housing partially removed to reveal an inner chassis and security door cooperatively securing a cashbox inside the gaming machine.

Turning now to FIG. 5A, a side-view illustration of the cashbox security mechanism 160 is shown in accordance with embodiments of the present invention. The security mechanism 160 is intended to secure a cashbox 162 (shown hidden with dashed lines in FIG. 5A) or other portable currency-transport container. In general, the illustrated cashbox 162 stows currency documents, such as paper currency and/or substitute currency media, received from the currency processing device 120. In addition, or as an alternative thereto, the cashbox 162 may also be designed to accept and stow other types of currency, such as, but not limited to, coins, gaming tokens, etc.

In accordance with the exemplary configuration of FIG. 5A, the security mechanism 160 includes three components: an outer housing 164, an inner chassis 166 and a security door 168. In alternative configurations, the security mechanism 160 may constitute additional, fewer, and/or alternative components to that illustrated in FIGS. 5A-5D. FIG. 5A shows a portion of the security mechanism outer housing 164 partially removed to reveal, inter alia, the inner chassis 166 and the security door 168 cooperatively securing the representative cashbox 162 inside the gaming machine 110, as will be described in extensive detail hereinbelow.

In the embodiment shown, the outer housing 164 includes a base 170, a top 172, and a plurality of sidewalls 174 (two of which are visible in FIG. 5A, a third having been removed to more clearly view the components located inside the outer housing 164, as noted above). The base 170, top 172, and sidewalls 174 are interconnected (e.g., via riveting, welding, bolting, etc.) or integrally formed (e.g., via hydroforming, thermoforming, injection molding, etc.) to collectively define a cavity, indicated generally by reference numeral 176, with an opening, generally indicated at 178 in FIG. 5A. In the illustrated embodiment, the inner chassis 166 is located at least partially inside of the cavity 176, pivotably/movably mounted to the outer housing 164. By way of example, the inner chassis is pivotably mounted to the outer housing 164 via one or more pivot joints 180 (such as pivot nuts; only one of which is visible in FIG. 5A, but a second identical pivot nut supporting the inner chassis 166 on an opposite side to that shown in the FIG. 5A), each passing through a respective lateral sidewall of the inner chassis 166 and outer housing 164.

In a similar respect, the security door 168 is pivotably/movably mounted to the outer housing 164, for example, via one or more pivot joints 180 (only one of which is visible in FIG. 5A, but a second identical pivot nut supporting the security door 168 on an opposite side thereof), each passing through a lower segment of lateral sidewalls of the security door 168. When oriented as shown in FIG. 5A, the security door 168 at least partially obstructs the cavity opening 178, concealing the cashbox 162 inside the movable, inner chassis 166.

In the illustrated embodiment, the outer housing 164 is rigidly mounted to the gaming machine platform 113, e.g., via bolts or rivets (not shown), inside of the cabinet 112. It is also contemplated that the cashbox security mechanism 160 be packaged external to the gaming machine cabinet 112 without departing from the intended scope and spirit of the present invention. Alternatively, it is also contemplated that the gaming machine cabinet 112 act as the cashbox security mechanism outer housing, eliminating the need for a separate component. In this latter instance, the inner chassis 166 and security door 168 may be mounted directly to the cabinet 112 or via an alternate buttressing swing structure.

With continuing reference to FIG. 5A, the inner chassis 166 includes a chassis base 182 and a plurality of chassis sidewalls 184 that extend generally orthogonally therefrom. The chassis base 182 and sidewalls 184 are interconnected (e.g., via riveting, welding, bolting, etc.) or integrally formed (e.g., via hydroforming, thermoforming, injection molding, etc.) to collectively define a pocket, designated generally as 186, with an opening 189. The pocket 186 is configured to nest the cashbox 162 therein. By way of example, in some embodiments of the present invention the pocket 186 is shaped and sized such that the cashbox 162 rests inside the pocket 186 in a generally coterminous manner. Put another way, the outer periphery of the cashbox 162 is bounded by, and generally coextensive with, at least a portion of the inner periphery of the chassis pocket 186 such that the cashbox 162 generally abuts at least a portion of the internal periphery of the chassis pocket 186 along all sides thereof. In some embodiments, cash box 162 is received by a portion of the bill validator 120, and the fit of the chassis pocket 186 with respect to the cashbox 162 is as tight as possible while allowing fit of the bill validator components and insertion/removal of the cash box 162.

The outer housing 164 of the security mechanism 160 is in operative communication with the currency processing device 120 to receive currency therefrom. The currency processing device 120 is coupled to inner chassis 166 (e.g., via money/credit detector 148) with an outer face of the currency processing device 120 laying generally flush with front fascia 118 of the gaming machine cabinet 112. Similarly, in this embodiment, the currency processing device 120, like the wager input device 188, is mounted to the inner chassis 166 for common movement therewith (as will be readily understood with reference to FIGS. 5B-5D and from the following discussion).

A player who wishes to play a wagering game on the gaming machine 110 inserts currency, such as one or more cash notes or currency vouchers, into a receiving slot (not shown) in the outer face of the wager input device 188. The currency documents (not shown) are transferred serially from the wager input device 188 through the currency processing device 120 to the cash box 162 via a transport mechanism, which may comprise a plurality of opposing driving and driven rollers (not visible in the views provided) housed inside of the wager input device 188, currency processing device 120 and a bill feeder 190. The currency processing device 120 housed inside the cabinet 112 examines each document passing therethrough, and generates one or more output signals that are used, at least in part, to process the currency documents. For example, the currency processing device 120 may include one or more sensors (not shown) which are operable, for example, to count, denominate, and/or authenticate the currency. In particular aspects of the disclosed concepts, the currency processing device 120 may operatively house any combination of the following detection means without limitation in one or more alternative embodiments: an optical scan head, a single or multitude of magnetic sensors, a thread sensor, one or more infrared sensors, an ultraviolet/fluorescent light scan head, a media detector, or any other sensing means operable to detect characteristic information from a document.

The inner chassis 166 is pivotably mounted with respect to the outer housing 164 to pivot about a first axis A1 (FIG. 5A), and selectively transition back and forth between a first chassis position (shown in FIG. 5A), also referred to herein as a "securing position," and a second chassis position (shown in FIG. 5D), also referred to herein as an "open position." Likewise, the security door 168 is pivotably mounted with respect to the outer housing 164 to pivot about a second axis A2 (FIG. 5A) and selectively transition back and forth between a first security door position (shown in FIG. 5A), also referred to herein as a "securing position," and a second security door position (shown in FIG. 5D), also referred to herein as an "open position." In the illustrated embodiment, the first and second axes A1 and A2 are generally parallel, but axially offset from one another.

As can be seen in the embodiment of FIG. 5A, the security door 168, when in the first security door position, at least partially obstructs the outer housing cavity opening 178, and extends over and blocks the inner chassis pocket opening 189. In addition, when the inner chassis 166 is oriented in the first chassis position of FIG. 5A, the chassis opening 189 is axially misaligned with a cabinet access opening 224 (FIG. 5D) such that removal of the cashbox 162 from the cabinet 112 is hindered. Moreover, the security door 168, when in the first security door position, cooperates with the inner chassis 166, when in the first chassis position, to conceal and secure the cashbox 162 within the inner chassis 166. In other words, the cashbox 162 is stowed and locked inside the inner chassis 166 and, thus, not removable from the gaming machine 110 when the inner chassis 166 and security door 168 are oriented as shown in FIG. 5A. In some embodiments, the security door 186 may be eliminated, while in other embodiments the cash box security mechanism 160 may include more than one security door 168.

Figure 5B:
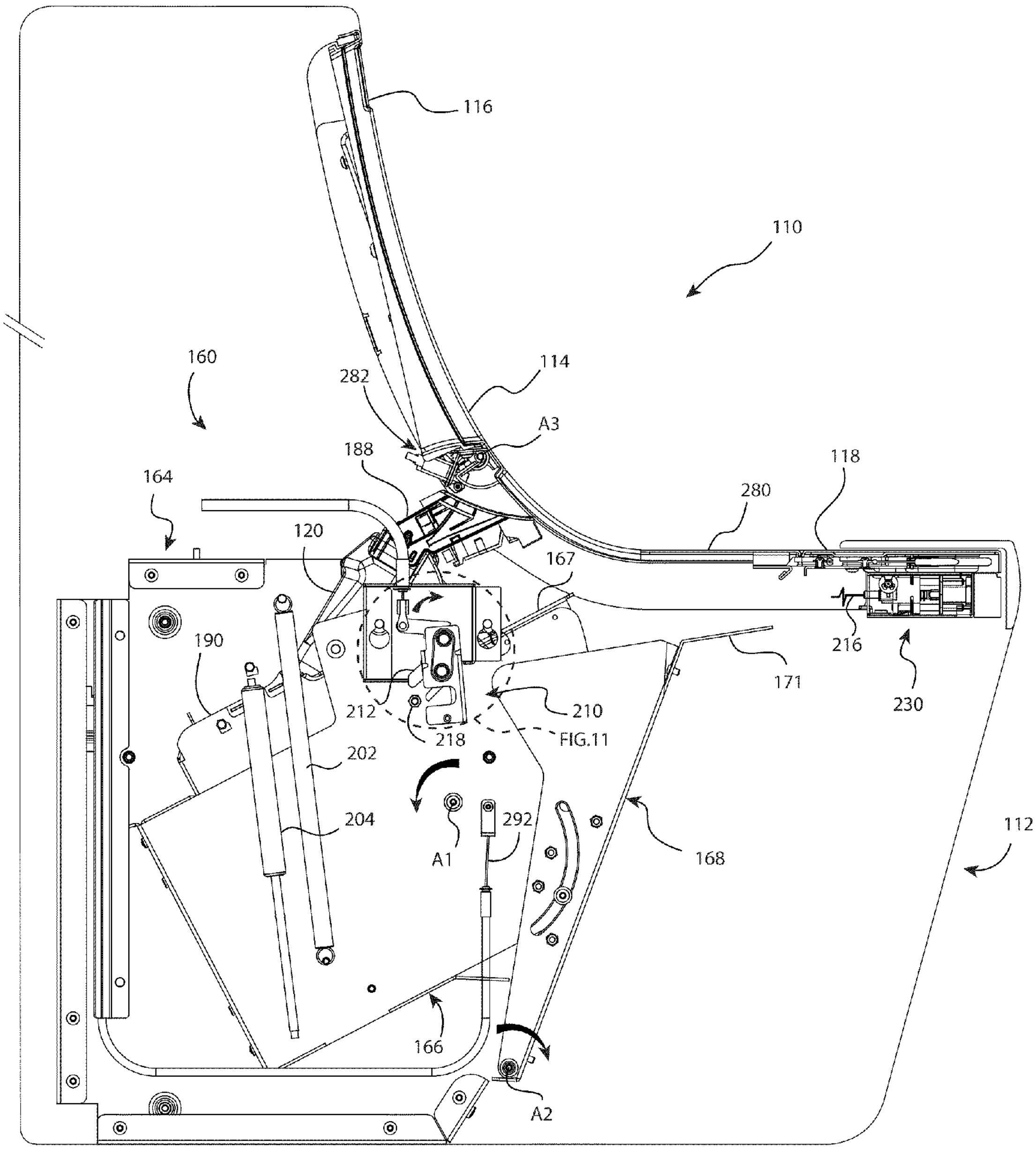
FIG. 5B is a side-view illustration of the gaming machine and cashbox security mechanism of FIG. 5A, showing the inner chassis and security door in respective released states.
Figure 5C:
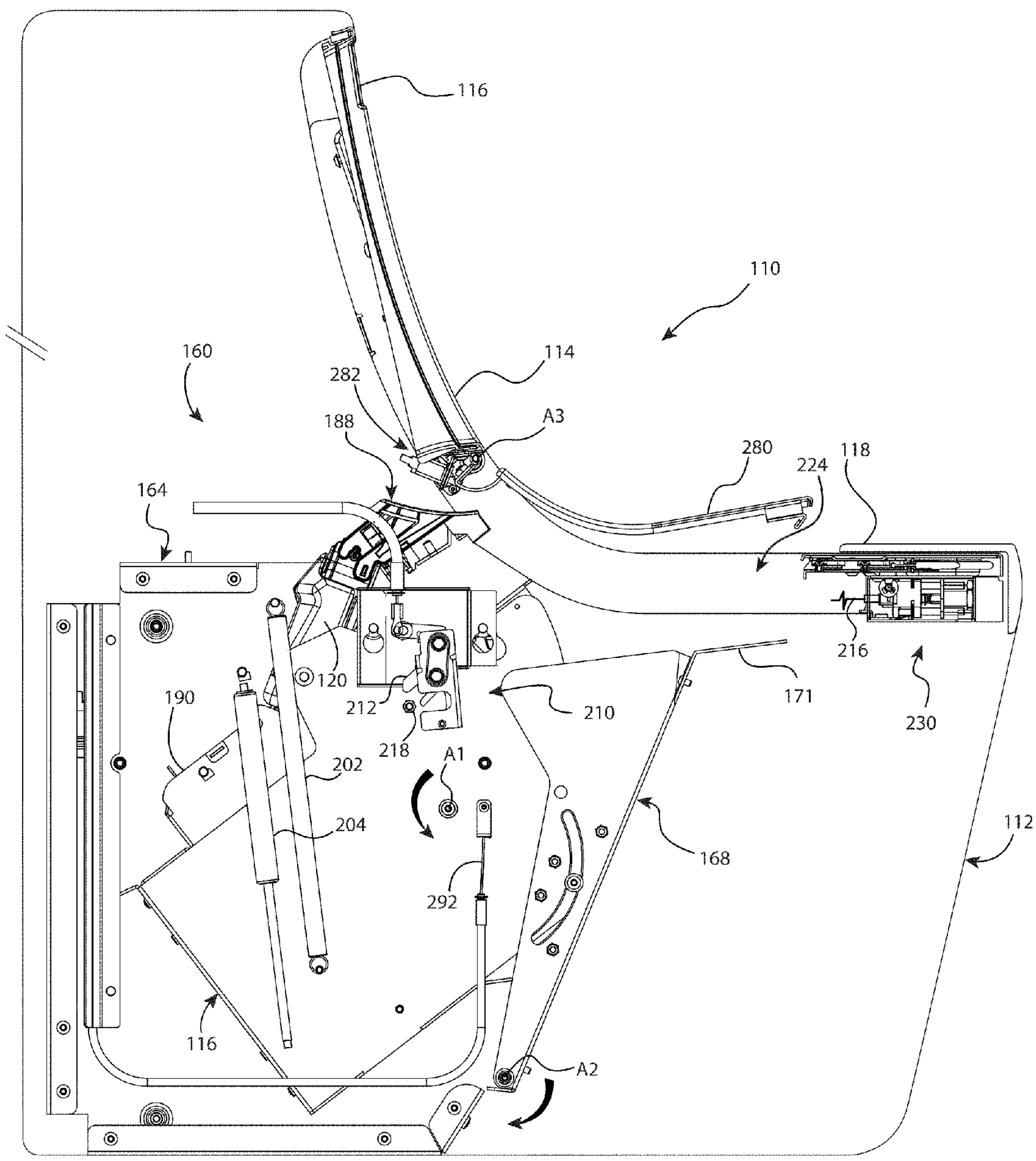
FIG. 5C is a side-view illustration of the gaming machine and cashbox security mechanism of FIGS. 5A and 5B, showing the inner chassis passing a predetermined intermediate position, thereby triggering an access door latch and releasing an access door.
Figure 5D:
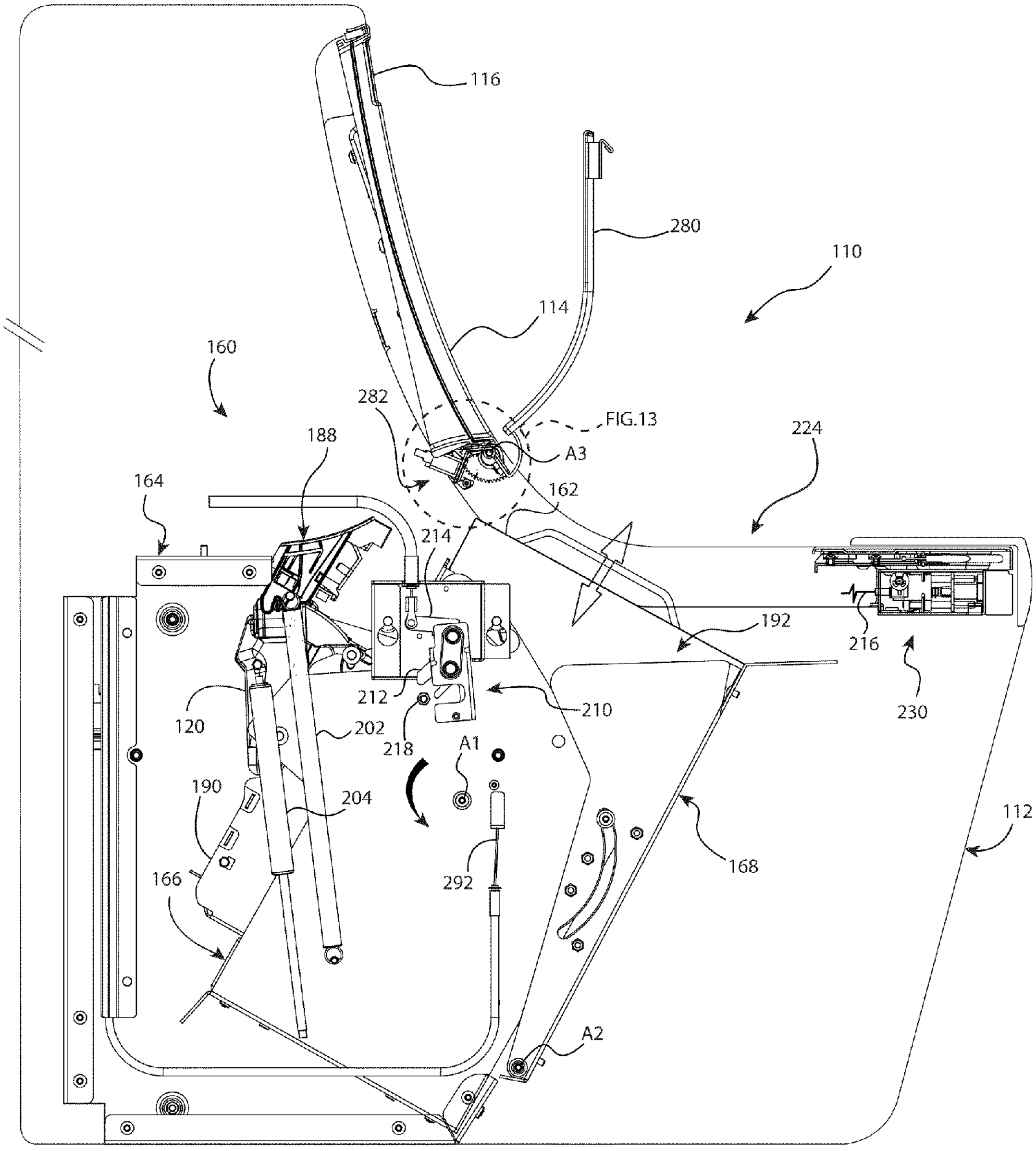
FIG. 5D is a side-view illustration of the gaming machine and cashbox security mechanism of FIGS. 5A-5C, showing the inner chassis, security door, and access door in respective open positions.

In contrast, the security door 168, when in the second security door position, tilts away from the outer housing 164 and inner chassis 164, as seen in FIG. 5D. Moreover, when the inner chassis 166 is oriented in the open position of FIG. 5D, the chassis opening 189 is axially aligned with the cabinet access opening 224 such that removal of the cashbox 162 from the cabinet 112 is facilitated. In this orientation, the security door 168 cooperates with the inner chassis 166, when in the second chassis position (FIG. 5D), to define an access chute, indicated generally as 192 in FIG. 5D, through which the cashbox 162 (FIG. 5A) is accessible and removable from the cashbox security mechanism. Put another way, when the security door 168 and inner chassis 166 are in their respective second, open positions (oriented as shown in FIG. 5D), they collectively form a channel or chute 192 with the same general lateral cross-sectional geometry as the cashbox 162 such that an operator can reach into the inner chassis 166 and extract the cashbox 162 therefrom. In this orientation, the cashbox 162 is removable from the security mechanism 160 and the cabinet 112.

According to certain features of the present concepts, the security door 168 is attached to the inner chassis 166 via a mechanical coupling such that transitioning the inner chassis 166 from the first, securing position of FIG. 5A to the second, open position of FIG. 5D urges the security door 168 from its respective first, securing position of FIG. 5A to the second, open position of FIG. 5D. In essence, the mechanical coupling may be said to coordinate and synchronize movement of the security door 168 and inner chassis 166. In one exemplary configuration, the mechanical coupling comprises a guide pin 194 that protrudes from a later sidewall 184 of the inner chassis 166. The guide pin 194 is slidably received in a generally-vertically oriented, elongated and arcuate guide channel 196 defined through one of two lateral flanks 169 of the security door 168 (only one of which is visible in FIGS. 5A-5D, but a second identical flank being located on an opposite side of the security door 168 to that shown in the FIGS.).

When the inner chassis 166 is unlatched, as explained hereinbelow with respect to FIG. 5B, the mass of the chassis to the left of axis A1 with respect to FIG. 5A (i.e., over the "load arm"), which may include the mass of the cashbox 162 when nested inside pocket 186, creates a moment arm on the inner chassis 166. This moment arm acts to swing the inner chassis 166 counterclockwise with respect to FIGS. 5A-5D. As the chassis 166 pivots about the first axis A1, the guide pin 194 also rotates counterclockwise with respect to FIGS. 5A-5D, sliding between first and second longitudinal ends 193 and 195, respectively, of the guide channel 196 coincident with the inner chassis transitioning from the first position (FIG. 5A) to the second position (FIG. 5D). Contemporaneously, the guide pin 194 presses against lateral walls 197 and 199 of the guide channel 196, which acts to push against and reposition the security door 168. The inner perimeter of the guide channel 196 may be provided with a low friction surface, such as a low-μ (μ="mu" or coefficient of friction) plastic slot block 200, along which the guide pin 194 presses as transitioning between longitudinal ends of the guide channel 196 to allow for smoother running of the guide pin 194.

Certain optional features of the present concepts include a biasing member 202, illustrated in FIG. 5A in a representative form as a helical spring, and a motion damper 204, illustrated in FIG. 5A in a representative form as a pneumatic cylinder. With regard to the former, the biasing member 202 is attached, for example, at one end to the inner chassis 166 and at an opposing end to the outer housing 164. The biasing member 202 operates to bias the inner chassis 166 toward the first chassis position shown in FIG. 5A. The motion damper 204, like the biasing member 202, is attached at one end to the inner chassis 166 and at an opposing end to the outer housing 164. In the embodiment shown, the motion damper 204 is a one-way damper—i.e., the motion damper 204 operates to dampen movement of the inner chassis 166 when pivoting from the first position (FIG. 5A) to the second position (FIG. 5D), but not vice versa.

Although illustrated as a helical spring, the biasing member 202 may take on additional forms, such as, but not limited to, a torsion spring or leaf spring, without departing from the scope and spirit of the present invention. In a similar regard, the motion damper 204 is presented as a one-way pneumatic cylinder, but may take on alternative configurations, such as a viscous rotary damper, two-way air cylinders, hydraulic cylinders, etc. Finally, the biasing member 202 and motion damper 204 may both be replaced by single prime mover, such as an electro-mechanical motor, operable to automate movement of the security mechanism 160 (i.e., the inner chassis 166 and security door 168).

The biasing member 202 may also operate to bias the security door 168 toward the first security door position (FIG. 5A) by biasing the inner chassis 166 toward the first chassis position (FIG. 5A). In particular, the biasing force applied to the inner chassis 166 by the biasing member 202 is transmitted from the inner chassis 166 to the security door 168 through the mechanical coupling (e.g., guide pin 194 and guide channel 196). Likewise, the motion damper 204 may also operate to dampen movement of the security door 168 when pivoting from the first to the second security door positions by damping movement of the inner chassis 166 when pivoting from the first to the second chassis positions. Specifically, the damping force applied to the inner chassis 166 by the motion damper 204 is transmitted from the inner chassis 166 to the security door 168 through the mechanical coupling (e.g., guide pin 194 and guide channel 196).

Referring now to FIGS. 5A-5B and FIGS. 10-11, the cashbox security mechanism 110 may further comprise a chassis latch, designated generally as 210, that selectively couples with the inner chassis 166. The chassis latch 210 operates, as described below, to retain the inner chassis 166 in the first, securing position (FIG. 5A) when coupled thereto. In one exemplary configuration, the chassis latch 210 includes a latch control plate 212 that is movably mounted inside the cabinet 112. In the example illustrated in FIG. 10, the latch control plate 212 is pivotably mounted to the outer housing 164 via bolt 213. A cable arm 214 is also movably mounted to the outer housing 164, pivoting about bolt 211. The cable arm 214 is attached at one end to a chassis release cable 216, and at an opposing end to a spring-loaded latch plate lock 220. Likewise, the latch plate 212 is attached at one end to the plate lock 220, and is configured to selectively engage a lock pin 218 at an opposing end thereof.

Figure 10:
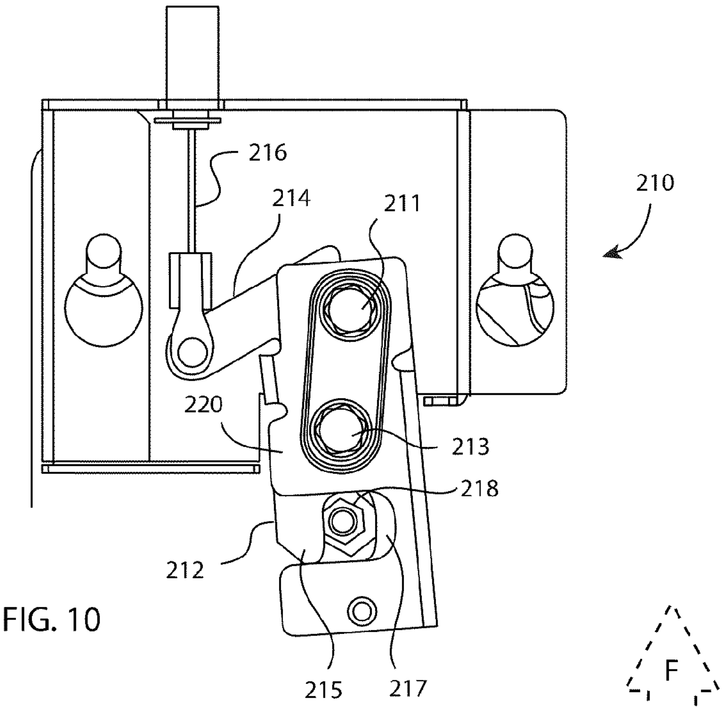
FIG. 10 is an enlarged side-view illustration of the chassis latch from FIG. 5A, shown in an engaged state.

Turning to FIGS. 5A and 10, the chassis latch 210 is shown coupled with the inner chassis 166, locking the inner chassis 166 in the first position (FIG. 5A). In the exemplary configuration, the latch plate 212 has a pair of tines 215 and 217 (FIG. 10) that surround the lock pin 218 when the chassis latch 210 is coupled with the inner chassis 166. As seen in FIG. 10, the lock pin 218 transitions in a counterclockwise motion under the moment arm created by the inner chassis 166, abutting against the left-most tine 215. The latch plate 212, however, when oriented as shown in FIGS. 5A and 10, is locked in place by the spring-loaded latch plate lock 220, preventing rotation of the inner chassis 166.

Upon activation of the chassis latch 210, the inner chassis 166 is freed, and allowed to rotate toward the open position shown in FIG. 5D. By way of explanation, and not limitation, in the exemplary configuration of FIGS. 5B and 11, a trigger force F applied to the chassis release cable 216 (e.g., via lock box 230, as discussed below) is transferred to the plate lock 220 via cable arm 211. This trigger force F generates a moment arm on the cable arm 211, triggering the plate lock 220, which in turn frees the latch plate 212 to rotate about bolt 215. As seen in FIG. 5B, the lock pin 218, under the moment arm created by the inner chassis 166, transitions in a counter-clockwise rotation, pressing past and disengaging from the released latch plate 212.

In contrast, to lock the inner chassis 166 in the first, securing position of FIG. 5A, the inner chassis 166 is pivoted in a clockwise direction with respect to FIG. 5A (e.g., by pressing down on the chassis lid 167 or pulling up on the security door flange 171). Once the inner chassis 166 progresses past the orientation shown in FIG. 5B, the lock pin 218 will press against the right-most latch plate tine 217, which acts to urge and rotate the latch plate 212 in a counterclockwise direction with respect to FIG. 5B. By urging the latch plate 212 into the orientation shown in FIGS. 5A and 10, it will reengage the spring-loaded latch plate lock 220, locking the latch plate 212 in the orientation shown in FIG. 10, whereby the inner chassis 166 is locked in the first chassis position.

Figure 6:
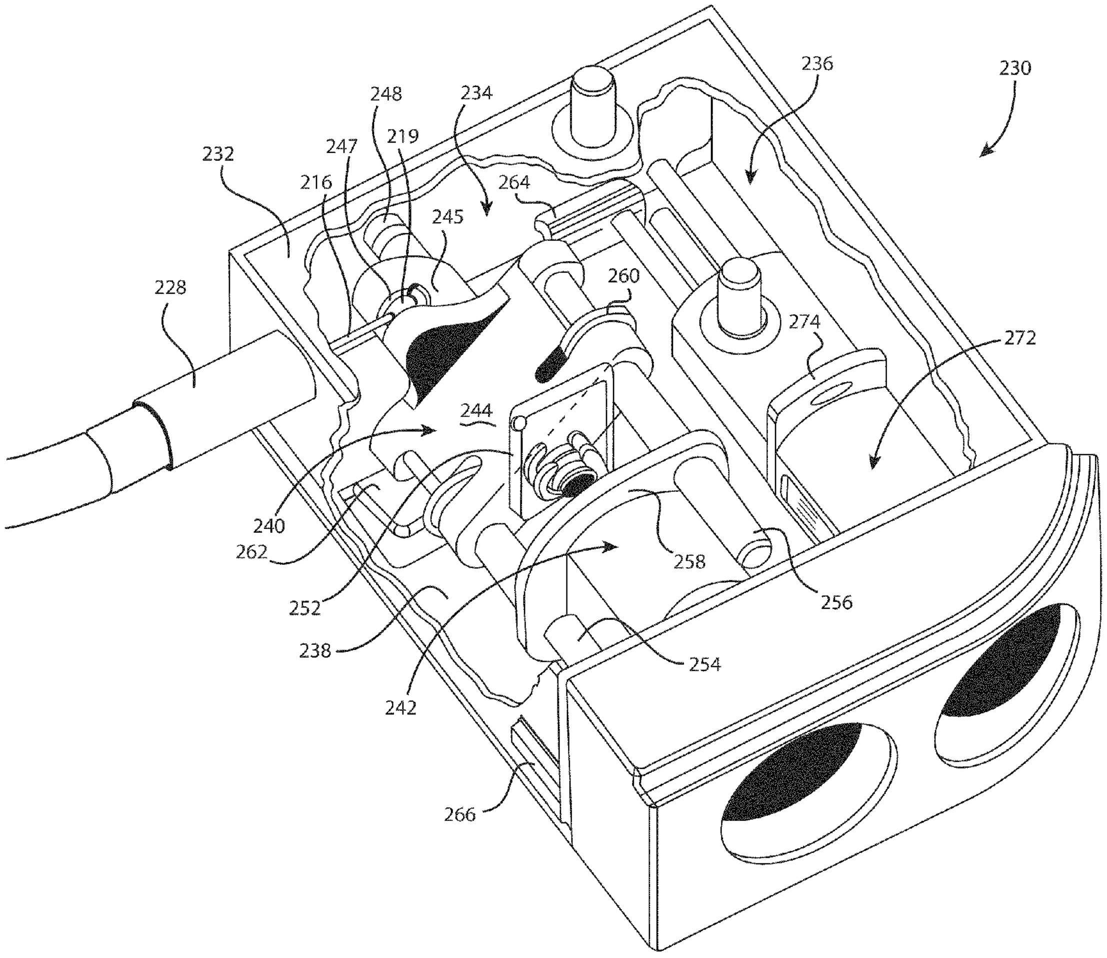
FIG. 6 is a perspective-view illustration of a lock box mechanism in accordance with embodiments of the present invention.
Figure 7:
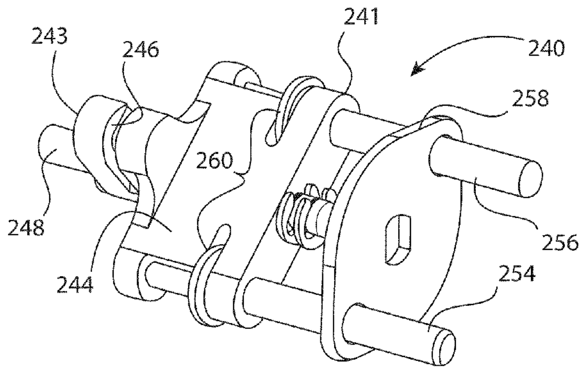
FIG. 7 is a perspective-view illustration of the lock box fork of FIG. 6.
Figure 9:
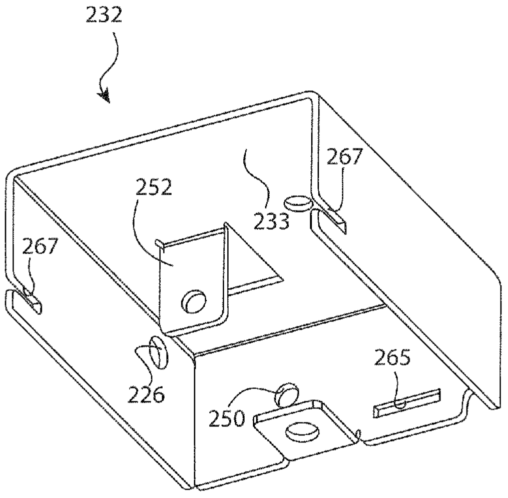
FIG. 9 is a perspective-view illustration of the lock box housing of FIG. 6.

Referring now to FIG. 6, a perspective view illustration of a lock box, designated generally as 230, is shown in accordance with certain aspects of the present concepts. In some embodiments, an operator can unlatch and/or open the chassis 166, security door 168, and access door 280 from the lock box 230. The lock box 230 is illustrated in FIG. 6 with the lock box housing 232 (best seen in FIG. 9) partially broken away to reveal the inner components of the lock box 230. In the embodiment shown in FIGS. 5A-5D, the lock box assembly 230 is packaged within the gaming machine cabinet 112, just under the front fascia 118, immediately adjacent the front end of the cabinet 112. However, it is contemplated that the lock box 230 be packaged at different locations with respect to the gaming machine 110, both resident in and external to the cabinet 112, without departing from the intended scope of the present invention.

Figure 8:
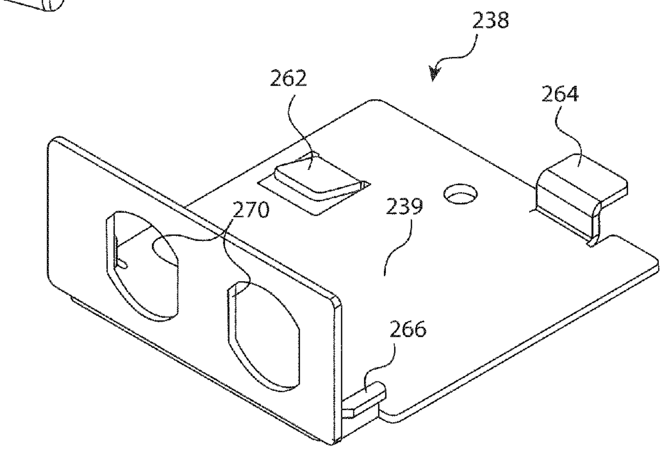
FIG. 8 is a perspective-view illustration of the lock box cover of FIG. 6.

The representative lock box 230 featured in FIGS. 6-9 includes two lock mechanisms: a primary lock mechanism, indicated generally at 234, and a secondary lock mechanism, indicated generally at 236. The primary and secondary lock mechanisms 234, 236 are secured within the lock box housing 232 via a cover plate 238 (best seen in FIG. 8). The cover plate 238 mates and interlocks with the lock box housing 232 via an integrally formed rearward-facing lip 264 and a pair of integrally formed laterally-facing lips 266 (one of which is visible in FIG. 6, and one of which is visible in FIG. 8). The rearward- and laterally-facing lips 264, 266 extend up and outward from a bottom face 239 of the lock box cover plate 238 (FIG. 8). The rearward-facing lip 266 (FIG. 8) is received in a complimentary rear-lip slot 265 (FIG. 9) in the lock box housing 232. In a similar regard, each of the laterally-facing lips 266 (FIG. 8) is received in a respective side-lip slot 267 (FIG. 9) in the lock box housing 232. An integral forward-flange 268 protrudes orthogonally from a forward edge of the bottom face 239 of the lock box cover plate 238 (FIG. 8). The forward-flange 268 has a pair of key lock slots 270 providing access to the key holes in the primary and secondary key locks 242 and 272, respectively.

The primary lock mechanism 234 is coupled to the chassis latch 210 whereby activating the primary lock mechanism 234 disengages the chassis latch 210 from the inner chassis 166. By way of example, in the exemplary configuration shown, the primary lock mechanism 234 includes a fork 240 (also featured in FIG. 7) that is coupled at one end 241 to the primary key lock 242, and coupled at an opposing end 243 to the chassis latch release cable 216. With regard to the latter, the fork 240 includes a fork body 244 with a cable slot 246 defined through a distal end 243 thereof (most clearly seen in FIG. 7). The cable slot 246 includes a large circular opening connected to an elongated channel, respectively designated 245 and 247 in FIG. 6. The large circular opening 245 is sized and shaped to receive a cable fitting 219 (or "cable ball") fixed at a proximal end of the release cable 216. The elongated channel 247, on the other hand, is designed to allow for play of the release cable 216 during rotation of the fork body 244, which is discussed below. The proximal end of the release cable 216 extends through the elongated channel 247, out a cable opening 226 (FIG. 9) in the lock box housing 232, through a cable sheave 228, and attaches at a distal end thereof to the cable arm 214, as seen in FIGS. 5A-5D, 10 and 11.

Continuing with the above example, the fork 240 is rotatably mounted inside of the lock box housing 232. By way of example, and not limitation, the fork 240 pivots about a primary shaft 248 that protrudes from a first side of the fork body 244. A distal end of the primary shaft 248 is received in a shaft slot 250 (FIG. 9) that extends through the lock box housing 232. According to FIG. 6, a proximal end of the primary shaft 248 is supported by an integrally formed housing flange 252, which extends generally orthogonally downward from the upper face 233 of the lock box housing 232. First and second fork pins 254 and 256, respectively, protrude from the proximal side 241 of the fork body 244. Each of the fork pins 254, 256 is received in a respective hole defined through lateral ends of a cam plate 258 that is affixed to the primary key lock 242 for common rotation therewith. One or both of the fork pins 254, 256 may be provided with an optional security disk 260. The security disk 260 engages with a security tab 262 that projects upward from a bottom face 239 of the lock box cover plate 238 (FIG. 8).

Figure 11:
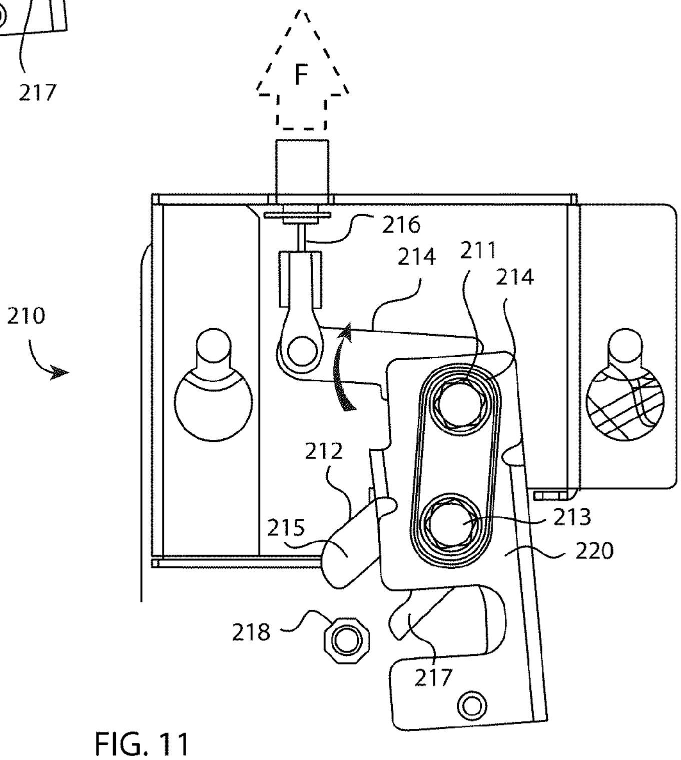
FIG. 11 is an enlarged side-view illustration of the chassis latch from FIG. 5B, shown in a disengaged state.

The primary lock mechanism 234 is in operative communication with the chassis latch 230 (e.g., mechanically coupled together via chassis release cable 216) to control the selective coupling and decoupling of the chassis latch 210 with the inner chassis 166. By way of example, and not limitation, activating the lock box 230, namely primary lock mechanism 234, disengages the chassis latch control plate 212 from the lock pin 218. To be more specific, an operator may "activate" the primary lock mechanism 234 by inserting the appropriate key (not shown) into the primary key lock 242, and turning the key clockwise with respect to FIG. 6. This action will rotate or swivel the cam plate 258 clockwise, which will, in turn, rotate the fork 240 clockwise due to the interface of the cam plate 258 with the first and second fork pins 254 and 256, discussed above. As the fork 240 rotates, the fork body 244 pulls on the chassis release cable 216 by urging the cable ball 219 rightward with respect to FIG. 6, such that a linear triggering force (e.g., trigger force F illustrated in FIG. 11) is applied to the chassis release cable 216. The linear triggering force F is transferred to the plate lock 220 via cable arm 211—the force F generates a moment arm on the cable arm 211, triggering the plate lock 220, which in turn frees the latch plate 212 to rotate about bolt 215, as seen in FIG. 11.

The secondary lock mechanism 236 acts as a supplemental security device, selectively preventing activation of the primary lock mechanism 234. For instance, in the embodiment illustrated in FIG. 6, the secondary lock mechanism 234 includes a jam plate 274 that is coupled to the secondary key lock 272 for common rotation therewith. The jam plate 274 selectively engages the primary key lock 242, thereby preventing rotation of the fork 240. In particular, when the secondary lock mechanism 272 is in a deactivated state, the jam plate 274 projects leftward with respect to FIG. 6, positioned or "wedged" between the lock box cover plate 238 and primary-lock cam plate 258. In this orientation, the jam plate 274 obstructs the path of the cam plate 258, impeding rotation of the primary key lock 242 and, thus, the fork body 244. Alternatively, the jam plate 274 may be oriented at other locations to impede the path of travel of other portions of the primary lock mechanism 234.

In contrast, activating the secondary lock mechanism 236 disengages the secondary lock mechanism 236 from the primary lock mechanism 234; when the secondary lock mechanism 236 is activated, the primary lock mechanism 234 may be freely activated. For instance, in the exemplary configuration shown in FIG. 6, an operator may "activate" the secondary lock mechanism 236 by inserting the appropriate key (not shown) into the secondary key lock 272, and turning the key clockwise with respect to FIG. 6. This action will rotate or swivel the cam plate 258 clockwise to the generally-vertical orientation shown in FIG. 6, displacing the cam plate 258 from the rotational path of travel of the primary lock cam plate 258.

Figure 12:
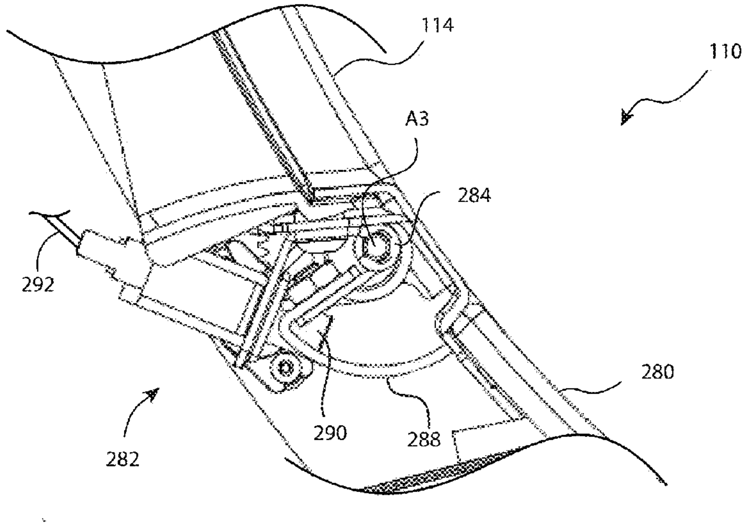
FIG. 12 is an enlarged side-view illustration of the access door latch from FIG. 5A, shown in an engaged state.
Figure 13:
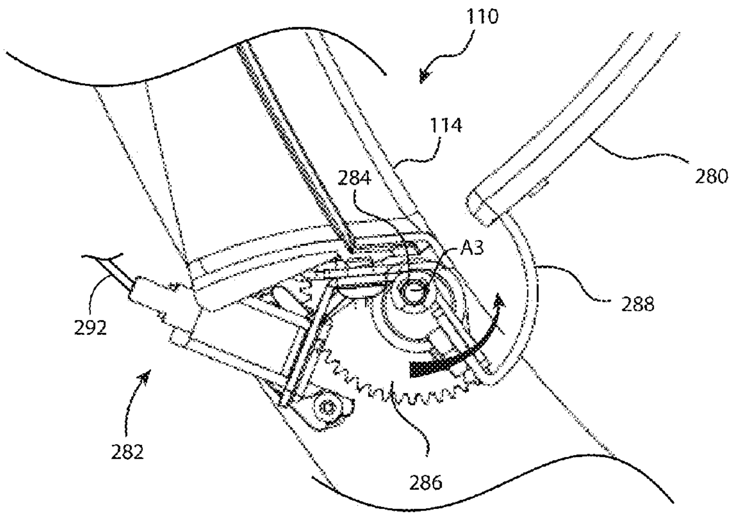
FIG. 13 is an enlarged side-view illustration of the access door latch from FIG. 5D, shown in a disengaged state.

Turning back to FIG. 5D, the cabinet 112 includes an access opening 224 through which the cashbox 162 may be inserted into, or removed from the gaming machine 110. In some embodiments of the present invention, for heightened security and safeguarding, the access opening 224 is the only opening in the cabinet 112 through which the cashbox 162 may be readily removed from the gaming machine 110. As seen in FIGS. 5A-5D, an access door 180 is pivotably mounted to the cabinet 112, adjacent the access opening 224. The access door 280 pivots about a third axis A3 to selectively transition between a first access door position (FIG. 5A; also referred to as "closed position") and a second access door position (FIG. 5D; also referred to as "open position"). In some embodiments, the third axis A3 is generally parallel to, but axially offset from the first and second axes A1 and A2 of the inner chassis 166 and security door 168, as seen, for example, in FIG. 5A. The access door 280, when in the closed position shown in FIGS. 5A and 5B, extends over and blocks the cabinet access opening 224, preventing access to the inner chassis 166 and the security door 168. Contrastingly, when the access door 280 is in the open position shown in FIG. 5D, it extends away from the cabinet 112, exposing the access opening 224, and providing access to the inner chassis 166 and the security door 168. A biasing member 284, shown in FIGS. 12 and 13 in a representative form as a torsion spring, may be operatively engaged with the access door 280 to bias the access door 280 toward the second access door position of FIG. 5D.

An access door latch, designated generally as 282 in FIGS. 5A-5D and FIGS. 12-13, may be provided to retain the access door 280 in the closed position shown in FIG. 5A. That is, the access door latch 282 may be configured to selectively couple with the access door 280, and thereby retain the access door 280 in the first "closed" position. In the illustrated embodiment, the access door 280 is mounted by a control arm 288 to a pivot gear 286 (FIG. 13), which rotates about axis A3. A spring-loaded pawl 290 (FIG. 12) engages one or more teeth of the pivot gear 286, locking the pivot gear 286 in place and thereby retaining the access door 282 in the closed position. In an alternative or optional implementation, an access door latch may be positioned at the opposite end of the access door 280.

Activating or triggering the access door latch 282 releases the access door 280, allowing for the access door 280 to transition to the second access door position shown, for example, in FIG. 5D. In the illustrated embodiment, the access door latch 282 is mechanically coupled to the inner chassis 166 such that the inner chassis 166 triggers the access door latch 282. According to one exemplary configuration, an access door cable 292 is attached at one end to the access door latch 282, and at a second, opposing end to the inner chassis, as seen in FIG. 5A. When the inner chassis 166 transitions from the first to the second positions, respectively shown in FIGS. 5A and 5D, as described above, the inner chassis 166 pulls the access door cable 292 (generally vertically with respect to FIG. 5B). When the inner chassis 166 rotates past a predetermined position, such as that shown in FIG. 5C, sufficient tension is applied to the access door cable 292 to displace the spring-loaded pawl 290 from the pivot gear 286, disengaging the latch 282 from the access door 280. Under the load of the biasing member 284, the access door is swung open from the closed position shown in FIG. 5B, through the position shown in FIG. 5C, to the open position shown in FIG. 5D.

Figure 14:
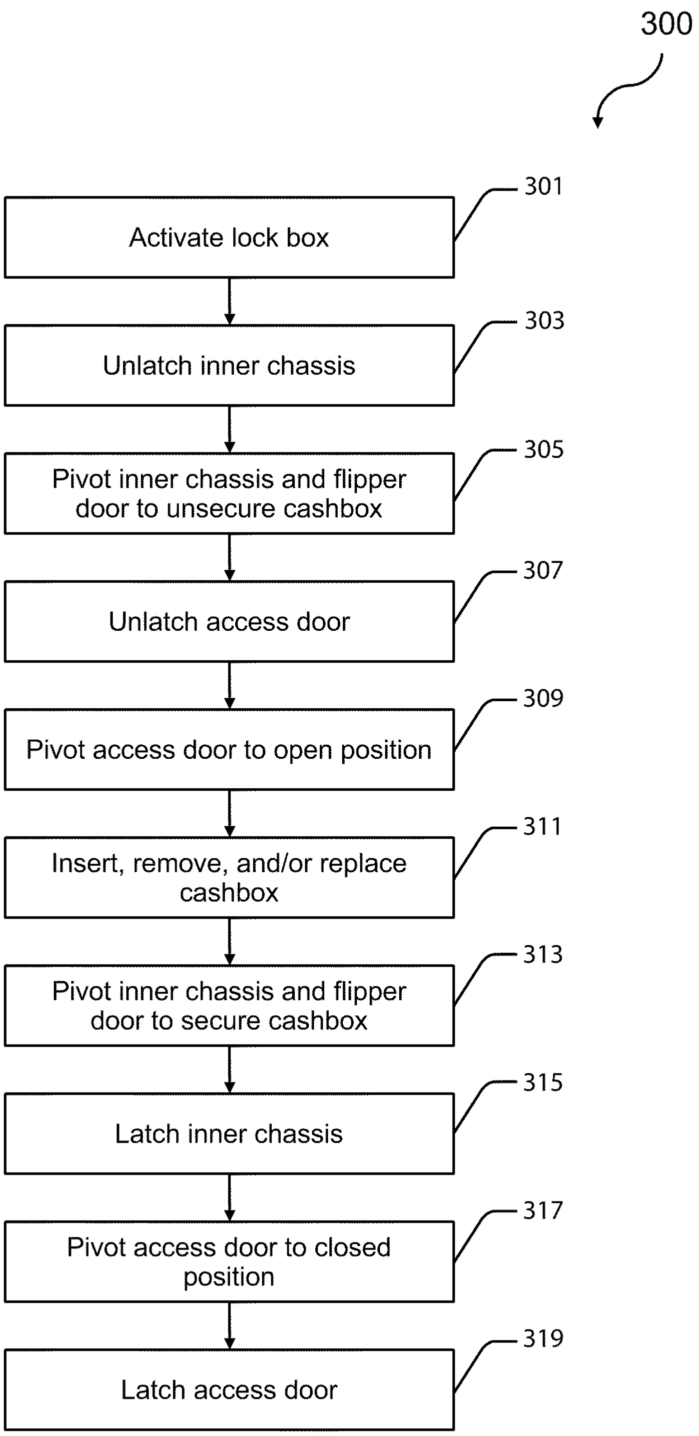
FIG. 14 is a flow chart diagrammatically illustrating a method for securing a cashbox in and/or removing a cashbox from a cabinet of a wagering game machine.

With reference now to the flow chart of FIG. 14, an improved method for securing a cashbox in and/or removing a cashbox from a cabinet of a wagering game machine is shown generally at 300. The method or algorithm 300 of FIG. 14 is described herein with respect to the structure illustrated in FIGS. 5-13; however, the claimed methods of the present invention are not limited to the representative configurations and arrangements displayed in FIGS. 5-13. Likewise, the various structures illustrated in FIGS. 5-13, singly or collectively, are in no way explicitly limited by the acts or methodology presented in FIG. 14.

Starting at step 301 of FIG. 14, for an operator to insert and/or remove a cashbox, such as cashbox 162 of FIGS. 5A and 5D, from a gaming machine 10 and 110 of FIGS. 1 and 5A, respectively, the operator first activates a lock mechanism, such as the primary lock mechanism 234 in lock box 230 (FIG. 6). As discussed above, an operator may "activate" the primary lock mechanism 234 of FIG. 6 by inserting the appropriate key (not shown) into a forward key slot of the primary key lock 242, and turning the key clockwise with respect to FIG. 6. However, as also noted above, the operator may also be required to first activate the secondary lock mechanism 236 before the primary lock mechanism 234 may be activated. For instance, in the exemplary configuration shown in FIG. 6, an operator may "activate" the secondary lock mechanism 236 by inserting the appropriate key (not shown) into a forward key slot of the secondary key lock 272, and turning the key clockwise with respect to FIG. 6. This will displace the cam plate 258 from the rotational path of travel of the primary lock cam plate 258, allowing for activation of the primary lock mechanism 234.

In step 303, a movable chassis that stows the cashbox, such as inner chassis 166, is unlatched or "freed" for selective movement. By way of explanation, FIGS. 5A and 10 show the chassis latch 210 coupled with the inner chassis 166, by which the inner chassis 166 is locked in the first "securing" position/orientation. When the primary lock mechanism 234 is activated, as described above, a trigger force F is applied to the chassis release cable 216, which is transferred to the plate lock 220 via cable arm 211. This force F triggers the plate lock 220, which in turn frees the latch plate 212 to rotate about bolt 215. As seen in FIG. 5B, for example, the lock pin 218, under the moment arm created by the force of gravity on the inner chassis 166, transitions in a counterclockwise motion, pressing past and disengaging from the released latch plate 212.

In step 305 of FIG. 14, the movable chassis and a security door, such as security door 168 of FIGS. 5A-5C, are repositioned to unsecure the cashbox. For example, activating the lock mechanism automatically pivots the movable chassis (e.g., under the force of gravity or a motor) from a secured orientation—e.g., FIG. 5A, at which the cashbox is locked inside the cabinet, to an unsecured orientation—e.g., FIG. 5D, at which the cashbox is removable from the cabinet. By way of clarification, and not limitation, when the inner chassis 166 is unlatched, a moment arm is created on the inner chassis 166, which acts to swing the inner chassis 166 counterclockwise from the orientation shown in FIG. 5A to the orientation shown in 5D. As the chassis 166 pivots about the first axis A1, the guide pin 194 also rotates counterclockwise with respect to FIGS. 5A-5D, sliding between first and second longitudinal ends 193, 195 of the guide channel 196 concurrent with the inner chassis movement. Contemporaneously, the guide pin 194 presses against the lateral channel walls 197, 199, pushing against and repositioning the security door 168 from the orientation shown in FIG. 5A to the orientation shown in 5D.

In step 307 of FIG. 14, an access door mounted to the gaming machine cabinet, such as access door 280 of FIG. 5A-5D, is unlatched. In some embodiments of the present invention, activating the lock mechanism automatically triggers an access door latch mechanism to thereby unlatch an access door movably mounted to cabinet. According to the exemplary arrangement presented in FIGS. 5A-5D, an access door latch 282 retains the access door 280 in the closed position shown in FIG. 5A. In the illustrated embodiment, the access door latch 282 is mechanically coupled to the inner chassis 166 (e.g., via cable 292) such that movement of the inner chassis 166 also triggers the unlatching of the access door latch 282. As the inner chassis 166 pivots from the secured to the unsecured orientations, respectively shown in FIGS. 5A and 5D, as described above, the inner chassis 166 pulls on the access door cable 292. When the inner chassis 166 rotates past a predetermined position (e.g., FIG. 5C), the tension applied to the access door cable 292 will displace the spring-loaded pawl 290 from the pivot gear 286 (FIG. 13), disengaging the latch 282 from the access door 280.

In step 309, the access door is moved to an open position to provide the operator with access to the inside of the cabinet and, thus the chassis. As described above, in some embodiments of the present invention, activating the lock mechanism automatically pivots the access door from a closed orientation—e.g., FIG. 12, at which the access door obstructs an access opening in the cabinet through which the cash box is removable, to an open orientation—e.g., FIG. 13, at which the access door exposes the access opening. For example, once the access door 280 is released or unlatched, the access door 280, under the load of biasing member 284, swings from the closed position (FIGS. 5A and 5B) to the open position (FIG. 5D). It is contemplated that steps 301 through 309 happen substantially simultaneously (e.g., within just a few seconds).

Thus, in some embodiments, all that is required to gain access to a cashbox is to activate the lock mechanism, since all other movements are sequentially triggered through the interplay of the inner chassis, the security door, and the access door. With the access door 280 open and the access opening 224 exposed, an operator may now reach into the cabinet of a gaming machine and extract a cashbox and/or insert a new/replacement cashbox at step 311.

If an operator now wishes to secure a cashbox within a gaming machine cabinet, the operator passes a new/replacement cashbox through the access opening of the cabinet, and places the cashbox inside the movable chassis mounted inside the cabinet of the wagering game machine. Thereafter, in step 313, the chassis is then moved from the unsecured orientation (e.g., FIG. 5D), at which the chassis opening is aligned with the cabinet access opening such that a cashbox may placed inside of or removed from the chassis, to the secured orientation (e.g., FIG. 5A), at which the chassis opening is misaligned with the cabinet access opening such that the cashbox is secured inside the chassis. As described above with respect to FIGS. 5A and 5D, to move the inner chassis to the first, securing position of FIG. 5A, the inner chassis 166 is pivoted in a clockwise direction with respect to FIG. 5A, for example, by pressing down on the chassis lid 167 or pulling up on the security door flange 171. As the chassis 166 pivots about the first axis A1, the guide pin 194 also rotates clockwise with respect to FIGS. 5A-5D, pressing against the lateral walls 197, 199 of guide channel 196, which acts to push against and reposition the security door 168 into the orientation shown in FIG. 5A.

In step 315 of FIG. 14, the movable chassis and (in some embodiments) the security door are latched or locked into the positions shown in FIG. 5A. For example, once the inner chassis 166 pivots past the orientation shown in FIG. 5B, the lock pin 218 will press against the right-most latch plate tine 217, which acts to urge and rotate the latch plate 212 in a counterclockwise direction with respect to FIG. 5B. By urging the latch plate 212 into the orientation shown in FIGS. 5A and 10, it will reengage the spring-loaded latch plate lock 220, locking the latch plate 212 in the orientation shown in FIG. 10, whereby the lock pin 218 and, thus, the inner chassis 166 are locked in place.

Thereafter, in step 317, the access door is pivoted or otherwise moved to the closed position shown in FIG. 5A, and then latched or locked in place, in step 319. For instance, an operator need just press down on an upper surface of the access door 280 to move the access door from the open orientation/position of FIG. 5D to the closed orientation/position of FIG. 5A. When the access door 280 reaches the position shown in FIG. 5A, the spring-loaded pawl 290 (FIG. 12) engages one or more teeth of the pivot gear 286, locking the pivot gear 286 in place and thereby retaining the access door 282 in the closed position.

The method 300 preferably includes steps 301-319. However, it is within the scope and spirit of the present invention to omit steps, include additional steps, and/or modify the order presented in FIG. 14. For example, the access door may be unlatched through a separate, lock mechanism independent of the primary lock mechanism in the lock box. In another example, the chassis, security door and access door may be slid, rather than pivoted, between respective positions. In yet another example, it is contemplated that the access door be eliminated altogether; the inner chassis and security door providing sufficient security for the cashbox. It should be further noted that the method 100 represents a single sequence of securing a cashbox in and/or removing a cashbox from a cabinet of a wagering game machine. However, it is expected, as indicated above, that the method 300 be practiced repeatedly on one or more machines over any span of time.

While the best modes for carrying out the present invention have been described in detail, those familiar with the art to which this invention relates will recognize various alternative designs and embodiments for practicing the invention within the scope of the appended claims.

The invention claimed is:

1. A gaming machine for playing a wagering game, the gaming machine being configured to receive a portable cashbox for retaining currency deposited into the gaming machine, the gaming machine comprising:

a cabinet having at least one input configured to receive currency from a player;

a display positioned relative to the cabinet and configured to display an outcome of the wagering game;

a currency processing device positioned relative to the cabinet and configured to process currency received via the at least one input;

an inner chassis configured to hold the cashbox, the inner chassis being movably mounted inside the cabinet to selectively transition between first and second chassis positions; and a security door movably mounted inside the cabinet to selectively transition between first and second security door positions;

wherein moving the inner chassis from the first chassis position to the second chassis position automatically moves the security door from the first security door position to the second security door position; and wherein the security door, when in the first security door position, cooperates with the inner chassis, when in the first chassis position, to secure the cashbox within the cabinet.

2. The gaming machine of claim 1, wherein the security door, when in the second security door position, cooperates with the inner chassis, when in the second chassis position, to define an access chute through which the cashbox is removable from the inner chassis.

3. The gaming machine of claim 1, further including an outer housing disposed inside the cabinet, the outer housing includes walls defining a cavity with an opening, wherein the inner chassis is located at least partially inside of the cavity, wherein the inner chassis and the security door are movably mounted to the outer housing, and wherein the security door at least partially obstructs the opening of the cavity when in the first security door position.

4. The gaming machine of claim 1, further comprising:

a biasing member operatively engaged with the inner chassis to bias the inner chassis toward the first chassis position.

5. The gaming machine of claim 1, further comprising:

a motion damper operatively engaged with the inner chassis to dampen movement of the inner chassis when transitioning between the first chassis position and the second chassis position.

6. The gaming machine of claim 1, wherein the movement of the inner chassis is rotational.

7. The gaming machine of claim 1, wherein transitioning the inner chassis from the first chassis position to the second chassis position urges the security door from the first security door position to the second security door position via a mechanical coupling.

8. The gaming machine of claim 1, wherein transitioning the inner chassis from the first chassis position to the second chassis position occurs under the force of gravity on the inner chassis.

9. The gaming machine of claim 7, wherein the mechanical coupling comprises a guide pin protruding from one of the inner chassis and the security door, the guide pin being slidably received in a guide channel defined by the other of the inner chassis and the security door.

10. The gaming machine of claim 1, further comprising:

a chassis latch selectively coupling with the inner chassis, the chassis latch retaining the inner chassis in the first chassis position when coupled thereto; and a lock box in operative communication with the chassis latch, the lock box controlling the selective coupling of the chassis latch with the inner chassis.

11. The gaming machine of claim 1, further comprising:

an access door pivotably mounted to the cabinet to transition between a first access door position, at which the access door obstructs access to the inner chassis and the security door, and a second access door position, at which the access door provides access to the inner chassis and the security door.

12. A cashbox security mechanism for securing a cashbox configured to stow currency received from a currency processing device, the security mechanism comprising:

an outer housing in operative communication with the currency processing device to receive currency therefrom;

an inner chassis configured to retain the cashbox, the inner chassis being movably mounted to the outer housing to selectively transition between first and second chassis positions; and a security door movably mounted to the outer housing to selectively transition between first and second security door positions;

wherein moving the inner chassis from the first chassis position to the second chassis position automatically moves the security door from the first security door position to the second security door position;

wherein the security door, when in the first security door position, cooperates with the inner chassis, when in the first chassis position, to secure the cashbox within the outer housing; and wherein the security door, when in the second security door position, cooperates with the inner chassis, when in the second chassis position, to define an access chute through which the cashbox is removable from the cashbox security mechanism.

13. The security mechanism of claim 12, wherein the security door is attached to the inner chassis via a mechanical coupling such that moving the inner chassis to or from the first chassis position urges the security door to or from the first security door position, respectively, whereby the mechanical coupling synchronizes transitioning of the security door and inner chassis between respective first and second positions.

14. A gaming machine for playing a wagering game, the gaming machine comprising:

a cabinet;

at least one display attached to the cabinet and configured to display a randomly selected outcome of the wagering game;

a currency processing device within the cabinet and configured to receive currency from the player for playing the wagering game;

a removable cashbox located inside the cabinet and configured to stow the currency received by the currency processing device;

a moveable chassis holding the portable cashbox, the chassis being moveable between a first chassis position and a second chassis position, the portable cashbox being secured within the cabinet when the moveable chassis is in the first chassis position and being removable from the cabinet when the moveable chassis is in the second chassis position;

a movable security door mechanically coupled to the movable chassis, the security door being movable between first and second security door positions, wherein the moveable chassis, when moving to the second chassis position, presses against and thereby automatically moves the security door to the second security door position;

an access door fixed to the cabinet that, when opened, permits removal of the portable cashbox when the moveable chassis is in the second chassis position; and a lock assembly that, when actuated, automatically causes the moveable chassis to transition from the first chassis position to the second chassis position.

15. The gaming machine of claim 14, wherein the lock assembly, when actuated, automatically causes the moveable chassis to transition from the first chassis position to the second chassis position due to the force of gravity on the moveable chassis.

16. The gaming machine of claim 14, wherein the lock assembly, when actuated, unlocks the access door.

17. The gaming machine of claim 16, wherein the lock assembly, when actuated, automatically causes the access door to move toward an open position to permit removal of the portable cashbox.

18. The gaming machine of claim 17, wherein the moveable chassis and the access door are coupled through a mechanical coupling, the transition of the moveable chassis from the first chassis position to the second chassis position automatically causing the access door to move to the open position.

19. The gaming machine of claim 18, wherein the mechanical coupling comprises a cable.

20. The gaming machine of claim 17, wherein the lock mechanism, when actuated, automatically causes the moveable chassis to transition from the first chassis position to the second chassis position and the access door to open due to the force of gravity on the moveable chassis.

21. The gaming machine of claim 14, wherein the moveable security door cooperates with the moveable chassis to secure the portable cashbox and to define an access chute through which the portable cashbox is removable from the cabinet.

22. The gaming machine of claim 21, wherein the moveable security door, when in the first security door position, cooperates with the moveable chassis to secure the portable cashbox, and, when in the second security door position, cooperates with the moveable chassis to define the access chute the security door being automatically moveable between the first security door position and the second security door position due to the force of gravity on the moveable chassis.

23. The gaming machine of claim 14, wherein the moveable chassis is moveable between the first chassis position and the second chassis position through rotational movement.

24. A method for securing a cashbox inside a wagering game machine, the method comprising:

passing the cashbox through an access opening defined in a cabinet of the wagering game machine;

placing the cashbox inside a chassis movably mounted inside the cabinet of the wagering game machine, the chassis defining an opening through which the cashbox is received; and moving the chassis from an unsecured orientation, at which the chassis opening is aligned with the cabinet access opening such that the cashbox is receivable by the chassis, to a securing orientation, at which the chassis opening is misaligned with the cabinet access opening such that the cashbox is secured inside the chassis;

wherein moving the chassis from the unsecured orientation to the secured orientation automatically moves a security door movably mounted inside the cabinet from an unblocking orientation to a blocking orientation, the security door, when in the blocking orientation, cooperating with the chassis, when in the secured orientation, to secure the cashbox within the cabinet of the gaming machine.

25. The method of claim 24, wherein the security door, when in the unblocking orientation, cooperates with the chassis, when in the unsecured orientation, to collectively define an access chute through which the cashbox is removable from the chassis, and when the security door is in the blocking orientation, the security door obstructs the chassis opening thereby securing the cashbox inside the chassis.

26. A method for removing a portable cashbox from a cabinet of a wagering game machine, the method comprising:

activating a lock mechanism to thereby unlatch a movable chassis, the cashbox being stowed inside the movable chassis, wherein activating the lock mechanism automatically:

pivots the movable chassis, under the force of gravity, from a secured orientation at which the cashbox is locked inside the cabinet to an unsecured orientation at which the cashbox is removable from the cabinet;

pivots a security door, under the force of the moving chassis, from a blocking orientation to an unblocking orientation at which the security door and the chassis collectively define an access chute through which the cashbox is removable from the chassis;

triggers an access door latch mechanism to thereby unlatch an access door movably mounted to cabinet; and opens the access door, under the force of a biasing member, so that the cash box is accessible through the cabinet;

removing the portable cashbox from the movable chassis and the wagering game machine cabinet.

* * * * *